US012762262B1

(12) United States Patent
Rahija et al.

(10) Patent No.: US 12,762,262 B1
(45) Date of Patent: Oct. 13, 2026

(54) SYSTEM AND METHOD FOR MANAGING PERSONALLY IDENTIFIABLE INFORMATION OF AN INDIVIDUAL

(71) Applicant: The PNC Financial Services Group, Inc., Pittsburgh, PA (US)

(72) Inventors: Mark Anthony Rahija, Medina, OH (US); Anthony Michael Marmo, Sewickley, PA (US); Patrick Hartleib, Huron, OH (US)

(73) Assignee: THE PNC FINANCIAL SERVICES GROUP, INC., Pittsburgh, PA (US)

( * ) Notice: Subject to any disclaimer, the term of this patent is extended or adjusted under 35 U.S.C. 154(b) by 133 days.

(21) Appl. No.: 18/584,648

(22) Filed: Feb. 22, 2024

Related U.S. Application Data

(60) Provisional application No. 63/486,806, filed on Feb. 24, 2023.

(51) Int. Cl.
*G06F 21/62* (2013.01)

(52) U.S. Cl.
CPC ................................ *G06F 21/6218* (2013.01)

(58) Field of Classification Search
CPC ....... G06F 21/6245; G06F 16/93; G06F 16/23
See application file for complete search history.

(56) References Cited

U.S. PATENT DOCUMENTS

| | | | | |
|---|---|---|---|---|
| 11,392,720 | B2 * | 7/2022 | Brannon | G06F 21/602 |
| 2020/0117824 | A1 * | 4/2020 | Upadhyay | G06F 16/258 |
| 2020/0293679 | A1 * | 9/2020 | Handy Bosma | H04L 63/10 |
| 2020/0311303 | A1 * | 10/2020 | Wang | G06F 21/602 |
| 2022/0382713 | A1 * | 12/2022 | Sadiq | G06F 16/27 |
| 2023/0043222 | A1 | 2/2023 | Park et al. | |
| 2023/0090611 | A1 * | 3/2023 | Ciampaglia | G06F 21/6245 726/27 |
| 2024/0012681 | A1 | 1/2024 | Durazzo et al. | |
| 2025/0245071 | A1 | 7/2025 | Ionescu et al. | |

* cited by examiner

*Primary Examiner* — Cindy Nguyen
(74) *Attorney, Agent, or Firm* — FINNEGAN, HENDERSON, FARABOW, GARRETT & DUNNER L.L.P

(57) ABSTRACT

A computer-implemented method for deleting an individual's personal data is provided. A request to delete the individual's personal data may be received from a communication device associated with the individual. The individual's identity may be verified. Responsive to verifying the individual's identity, the request may be compared with a data retention policy, wherein the data retention policy may comprise a data retention end date. If a date of the request is earlier than the data retention end date, a denial notification may be generated and transmitted to the communication device to notify the individual that the request is denied based on the data retention end date. Responsive to a determination that the date of the request is later than the data retention end date, the request to delete the individual's personal data from one or more associated databases may be processed.

23 Claims, 15 Drawing Sheets

300

400

SYSTEM AND METHOD FOR MANAGING PERSONALLY IDENTIFIABLE INFORMATION OF AN INDIVIDUAL

The present application claims priority to Provisional U.S. Patent Application No. 63/486,806, filed on Feb. 24, 2023, the disclosure of which is incorporated herein by reference in its entirety.

The present disclosure relates generally to systems and methods for managing personally identifiable information of an individual. More specifically, and without limitation, this disclosure relates to systems and methods for searching for personally identifiable information (PII), deleting PII, and/or updating PII across the distributed computer databases.

Some businesses may maintain PII of an individual to be able to transact business with the individual. For example, the PII may include the individual's full name, home address, telephone number, and other information that may be used to identify the individual. Under certain privacy laws and regulations, such as California Privacy Rights Act (CPRA) and General Data Protection Regulation (GDPR), the individual may request the business to delete the PII under certain circumstances, such as when the individual no longer interacts with the business. In some circumstances (for example, to comply with regulations), the business may be required to retain the PII for a predetermined period of time, possibly even after the individual no longer interacts with the business.

Some existing solutions to handling PII (including deleting PII upon request) may require the business to manually search its records and manually delete the PII. Manually performing this process is time-consuming, may be error-prone (for example, certain PII may be missed if all relevant databases or data stores are not searched), and it may be difficult to maintain records of incoming PII deletion requests and when those requests are satisfied, as may be needed for the business to comply with reporting requirements associated with privacy regulations.

In view of the foregoing, there is a need to overcome these and other drawbacks of existing systems, such as efficiency, accuracy, and time. Further, there is a need for improved systems and methods for managing PII, including deleting PII and updating PII. Systems and methods are disclosed for managing PII with increased efficiency and reduced processor resources needed to perform automated, metadata driven, repeatable, and controlled searches across multiple data repositories. The disclosed systems and methods enable easier compliance with privacy laws such as CPRA, GDPR, and other requirements for the right to access, modify, and delete personal information. The disclosed systems and methods also allow for generation of highly optimized SQL queries that reduce system resource load and time. The disclosed systems and methods are highly scalable via docker and OpenShift (OCP) to reduce total search time thus allowing to handle a higher volume of case requests. The disclosed systems and methods provide improved architecture and software engineering of the code to allow maintainability and future extensibility.

In view of the foregoing, embodiments of the present disclosure provide computer-implemented systems and methods for searching for PII, deleting PII, and updating PII. The description below provides some exemplary aspects of some computer-implemented systems and methods for searching for PII, deleting PII, and updating PII in accordance with some exemplary embodiments.

A method for accessing personally identifiable information of an individual is provided. At least one processor may receive a request for personally identifiable information from a communication device associated with the individual. The request may be logged in a transaction log by the at least one processor. Logging may be performed by an orchestrator service via a database table. The individual's identity may be verified by the at least one processor. Responsive to verification of the individual's identity, one or more queries may be generated by the at least one processor for retrieving the individual's personally identifiable information from one or more data storage systems and a response may be received from each of the one or more data storage systems by the at least one processor, wherein at least one of the responses comprises the individual's personally identifiable information from each of the one or more data storage systems.

A computer-implemented method for deleting an individual's personal data is provided. A request to delete the individual's personal data may be received by the at least one processor from a communication device associated with the individual. The individual's identity may be verified by the at least one processor. Responsive to verification of the individual's identity, the request may be compared with a data retention policy by the at least one processor, wherein the data retention policy comprises a data retention end date. The request may be compared to a Record Retention Schedule comprising a tracking system. Responsive to a determination that the data is available for deletion, the request may continue. Responsive to a determination that the data is not available for deletion, such as, for example, because the data is needed for a legally required record retention schedule, a reject letter may be automatically populated. The at least one processor may determine whether a date of the request is earlier than the data retention end date. Responsive to a determination that the date of the request is earlier than the data retention end date, a denial notification may be generated and transmitted to the communication device to notify the individual that the request is denied based on the data retention end date. Responsive to a determination that the date of the request is later than the data retention end date, the request to delete the individual's personal data from one or more databases associated with the at least one processor may be processed.

A system for processing data across a plurality of services is provided. The system may comprise a memory storing instructions and a processor configured to execute the stored instructions. The stored instructions may configure the processor to implement an orchestrator component configured to coordinate data traffic to each of the plurality of services and generate and maintain a queue configured to store a plurality of events including the data to be processed. Each of the plurality of services may be configured to monitor the queue; remove an event from the queue; process the event, wherein the each of the plurality of services may process one event at a time; and may return results of the event to a central data store. Responsive to a determination of a failure to process the event, the processor may be configured to flush any results related to the event, place the event in a special queue, and reset the service to enable the service to process another event.

A method for processing data across a plurality of services is provided. An orchestrator component may be instantiated by the at least one processor, wherein the orchestrator component may coordinate data traffic to each of the plurality of services. Each orchestrator component may coordinate data traffic to each of the plurality of services via a System of Record (SOR), which may be a common Data Map point for a master data list with the proviso that other peripheral or copied repositories take lead from that common Data Map point. Each of the plurality of services may be instantiated by the at least one processor. A queue may be instantiated by the at least one processor, wherein the queue comprises a plurality of events including data to be processed. The queue may be monitored by each of the plurality of services. An event may be removed from the queue by a first service of the plurality of services. Based on the generative list of data elements from the sources showing in the queue for the report, said queue may be used for other work sets. The event may be processed by the first service, wherein the first service processes one event at a time. The results of the event may be returned by the one service to a central data store. On a condition that the one service indicates a failure to process the event, any results related to the event may be flushed by the at least one processor, the event may be placed in a special queue by the at least one processor, and the one service may be reset by the at least one processor to enable the one service to process another event.

A method for scheduling tasks by a scheduling process in a computer system is provided. A command may be received by at least one processor from an orchestrator component via a scheduling queue. A task may be created by the at least one processor based on the received command. The task may be issued by the at least one processor to a service to perform the task at a predetermined time. The scheduling process may be placed into an idle state by the at least one processor after issuing the task until a next predetermined time.

It is to be understood that the foregoing general description and the following detailed description are exemplary and explanatory only and are not restrictive of the disclosed embodiments.

BRIEF DESCRIPTION OF DRAWINGS

The accompanying drawings, which comprise a part of this specification, illustrate several embodiments and, together with the description, serve to explain the principles and features of the disclosed embodiments. In the drawings.

DETAILED DESCRIPTION

Figure 1:
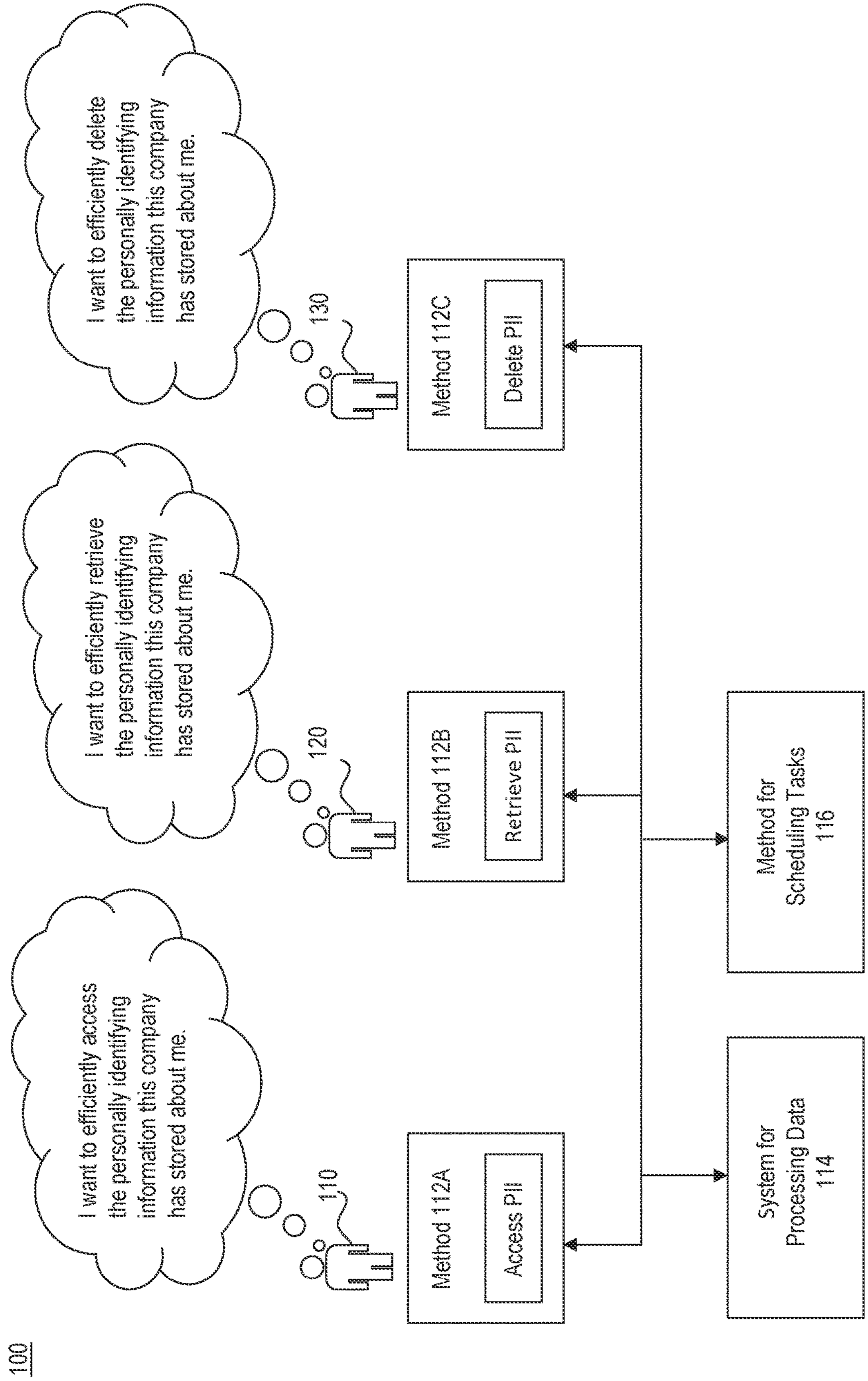
FIG. 1 shows an example of a usage scenario associated with systems and methods for accessing personally identifiable information, retrieving personally identifiable information, and/or deleting personally identifiable information across the distributed computer databases, consistent with some disclosed embodiments.

The present disclosure has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

In some embodiments, a method for accessing personally identifiable information of an individual is provided. At least one processor may receive a request for personally identifiable information from a communication device associated with the individual. The request may be logged in a transaction log by the at least one processor. The individual's identity, wherein the individual may be a customer, may be verified by the at least one processor. Responsive to verification of the individual's identity, one or more queries may be generated by the at least one processor for retrieving the individual's personally identifiable information from one or more data storage systems and a response may be received from each of the one or more data storage systems by the at least one processor, wherein at least one of the responses may comprise the individual's personally identifiable information from each of the one or more data storage systems.

In some embodiments, a computer-implemented method for deleting an individual's personal data is provided. A request to delete the individual's personal data may be received by the at least one processor from a communication device associated with the individual. The individual's identity may be verified by the at least one processor. Responsive to verification of the individual's identity, the request may be compared with a data retention policy by the at least one processor, wherein the data retention policy comprises a data retention end date. The request may be compared to a Record Retention Schedule which can comprise a tracking system. Responsive to a determination that the data is available for deletion, the request may continue. Responsive to a determination that the data is not available for deletion, such as, for example, because the data is needed for a legally required record retention schedule, a reject letter may be automatically populated. The at least one processor may determine whether a date of the request is earlier than the data retention end date. Responsive to a determination that the date of the request is earlier than the data retention end date, a denial notification may be generated and transmitted to the communication device to notify the individual that the request is denied based on the data retention end date. Responsive to a determination that the date of the request is later than the data retention end date, the request to delete the individual's personal data from one or more databases associated with the at least one processor may be processed. The individual may be queried whether the individual selects an option for the request to be automatically processed, on a condition that the querying is performed prior to placing the request in the queue. An indication from each subsystem that the individual's personal data has been deleted by each subsystem may be received. Responsive to a query, PII data may be retrieved.

In some embodiments, a system for processing data across a plurality of services is provided. The system may generate a case that is tracked by compliance with privacy laws. A case refers to a potential scenario in which a system receives an external request (such as user input) and responds to it. A case may be generated via a scheduler. The case may initiate searches by data repository teams across the bank. A search may be initiated by an orchestrator, which may create sub-tasks. The scheduler may search the sub-tasks, build the case with correct data and assign it to a service worker. The service worker may be allocated in Kubernetes. The system may be accessed via an API method to detect any new cases. On the occasion of detecting a new case, the system may generate response placeholders for each of three repositories (Enterprise Information Integration (EII), Enterprise Data Warehouse (EDW), Big Data Analytics (BDA)). Each response holder may have a data repository with different technologies, data models, and metadata. BDA may be used for data science laboratory support. EDW may be used for data warehouse analysis and reporting. The system may send work command messages with case provided input data to each service worker to scan the repository for the required case response. Responsive to a receipt of the work command message, a service worker may perform a plurality of queriers, accumulate data results, and respond to the internal orchestrator service. The orchestrator service may finalize the formatting and generate the data response.

A service worker may be a docker image operating in OCP environment. A docker image is a file used to execute code in a docker container. Docker images act as a set of instructions to build a docker container, like a template. Docker images also act as the starting point when using docker. Docker is used in the present disclosure as an exemplary container. The OCP environment may provide production control and resource scaling to handle variable workloads in a timely manner.

The system may comprise a memory storing instructions and a processor configured to execute the stored instructions. The stored instructions may configure the processor to implement an orchestrator component configured to coordinate data traffic to each of the plurality of services and generate and maintain a queue configured to store a plurality of events including the data to be processed. The memory storing instructions may comprise the data retention policy, wherein the data retention policy is accessed by the at least one processor and wherein a plurality of data stores is in communication with the at least one processor. Each of the plurality of services may be configured to monitor the queue; remove an event from the queue; process the event, wherein the each of the plurality of services may process one event at a time; and may return results of the event to a central data store. Responsive to a determination of a failure to process the event, the processor may be configured to flush any results related to the event, place the event in a special queue, and reset the service to enable the service to process another event.

In some embodiments, a method for processing data across a plurality of services is provided. An orchestrator component may be instantiated by the at least one processor, wherein the orchestrator component may coordinate data traffic to each of the plurality of services. Each orchestrator component may coordinate data traffic to each of the plurality of services via a SOR, which may be a common Data Map point for a master data list with the proviso that other peripheral or copied repositories take lead from that common Data Map point. Each of the plurality of services may be instantiated by the at least one processor. A queue may be instantiated by the at least one processor, wherein the queue comprises a plurality of events including data to be processed. The queue may be monitored by each of the plurality of services. An event may be removed from the queue by a first service of the plurality of services. Based on the generative list of data elements from the sources showing in the queue for the report, said queue may be used for other work sets. The event may be processed by the first service, wherein the first service processes one event at a time. The results of the event may be returned by the one service to a central data store. On a condition that the one service indicates a failure to process the event, any results related to the event may be flushed by the at least one processor, the event may be placed in a special queue by the at least one processor, and the one service may be reset by the at least one processor to enable the one service to process another event.

In some embodiments, a method for scheduling tasks by a scheduling process in a computer system is provided. A task may be a query for the PII. A command may be received by at least one processor from an orchestrator component via a scheduling queue. A task may be created by the at least one processor based on the received command. The task may be issued by the at least one processor to a service to perform the task at a predetermined time. The scheduling process may be placed into an idle state by the at least one processor after issuing the task until a next predetermined time.

In some embodiments, a special service may be instantiated and configured to monitor (e.g., "listen") to the special queue to detect when events are added to the special queue. When the special service detects that an event has been added to the special queue, the special service may restage the event from the special queue to the queue (e.g., the special service moves the event from the special queue to the first queue).

In some embodiments, a retry counter may be instantiated. A retry counter may be associated with each event in the special queue, such that each event in the special queue has a corresponding retry counter. The retry counter may be incremented when the same event is added to the special queue. For example, the first time an event (e.g., Event1) is added to the special queue, a retry counter associated with Event1 is set to 1. The next time Event1 is added to the special queue, the retry counter is further incremented.

The value of the retry counter may be compared to a threshold value. If the value of the retry counter is below the threshold value, the event may be restaged from the special queue to the first queue. If the value of the retry counter is equal to or greater than the threshold value, the event may be flagged for separate handling. For example, the flagged event may be processed immediately by a service. As another example, the flagged event may be sent to a specially designated service for processing. Other types of separately handling the flagged event may be contemplated to be within the scope of the disclosure.

In some embodiments, a progress dashboard may be created and displayed to a user on the data owner's side to view an overview status of PII requests. From the progress dashboard, the user may be able to assign tasks to a particular person to handle manually (if such tasks need to be handled manually) and may be able to generate and view reports based on aggregate information regarding the PII requests. For example, the dashboard may display to the user the number of requests over a particular time period (e.g., one month), a number of requests currently waiting to be processed, a breakdown of how long requests have been pending, a breakdown of how much time is left to process the requests (for example, some privacy regulations may require that the requests relating to PII are processed within a certain period of time, e.g., 45 days or less from the date the request is received), or a broad geographic category of where the requests came from (e.g., at the state level, such as California).

According to some embodiments, the operations, techniques, and/or components described herein can be implemented by a device or system, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that can incorporate hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems can control and schedule computer processes for execution, perform memory management, provide file system, networking, I/O services, and provide a user interface functionality, such as a graphical user interface (GUI), among other things.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. The word "to flush" means "to discard". The word "to mask" means "to hide". The word "to listen" means "to monitor". Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure. "Metadata" may include data providing information about one or more aspects of the data for each repository; it is used to summarize basic information about data that can make tracking and working with specific data easier. Metadata may identify the tables and columns to be used in queries and retrieval sets. Metadata may identify PII tokenization algorithms used for query optimization. Metadata may be supported by a plurality of tables and views in a database. Metadata may be used by the SQL generation system to build a correct statement per repository. Metadata may be collected asynchronously from an event-driven transaction processing. In some embodiments, Metadata may be updated every 30 days, or more or less frequently, as desired. "Data cluster" corresponds to a collection of data based on similarity. "Refreshing metadata" corresponds to re-pulling the metadata by the system. A "singleton service" corresponds to a service for which only one instance exists in an application. A "command message" is a directive to a computer program to perform a specific task, which may be issued via a command-line interface, as input to a network service as part of a network protocol, or as an event triggered in a graphical user interface. An "ingestion message" is a message generated in a process of obtaining and importing data for immediate use or storage in a database. "Column categorization" refers to assigning a column to the appropriate category according to the format identified by the metadata. "Column identification" refers to identifying a column according to the format identified by the metadata. "Table set" is a collection of tables containing the PII. A "reference table" is a table into which an enumerated set of possible values of a certain field data type is stored. "Tokenization" is an act of breaking up a sequence of strings into pieces such as words, keywords, phrases, symbols and other elements called tokens. "Bootstrap" is a base class in python framework.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures may be rearranged, combined, or divided without departing from the envisioned embodiments. Similarly, additional steps may be added, or steps may be removed without departing from the envisioned embodiments. Thus, the materials, methods, and examples are illustrative only and are not intended to be limiting.

FIG. 1 shows an example of a usage scenario 100 associated with systems and methods for managing PII across the distributed computer databases, consistent with disclosed embodiments. As shown in FIG. 1, a user 110 may access PII using a method 112A. A user 120 may retrieve PII using a method 112B. A user 130 may delete PII using a method 112C. An exemplary system 114 for processing personally identifiable information allows for the execution of methods 112A, 112B, and 112C, employing a method for scheduling tasks 116.

Figure 2:
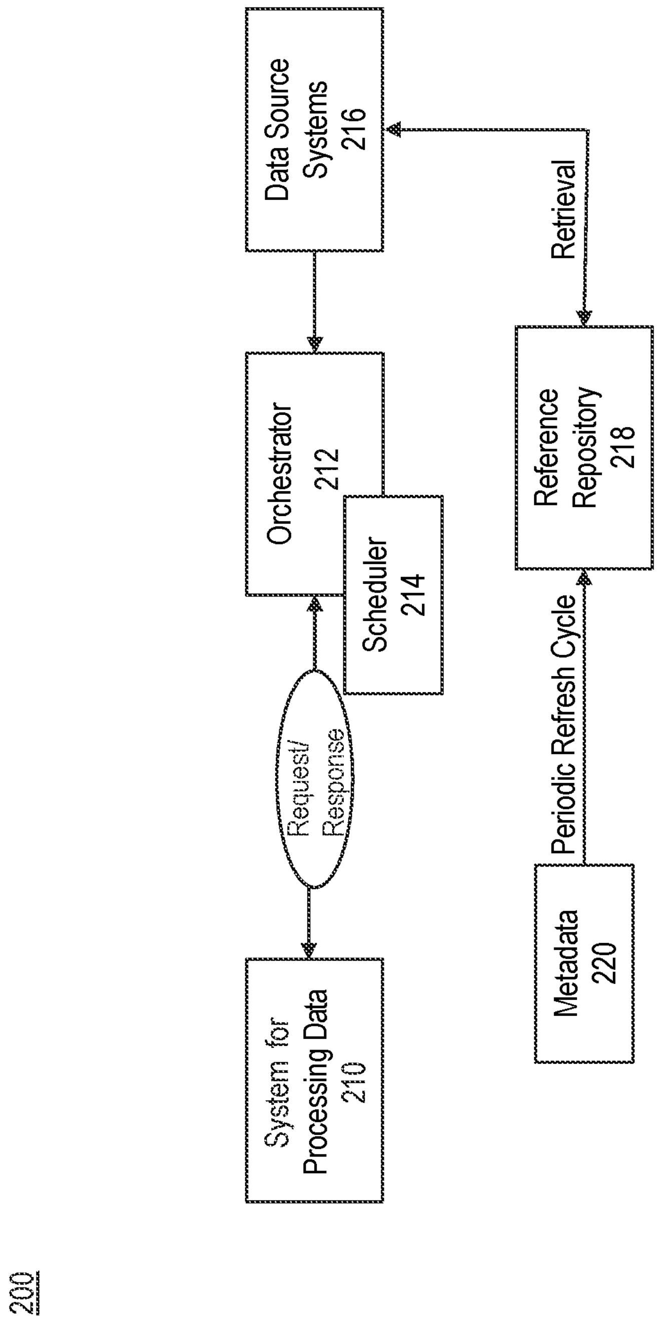
FIG. 2 is a diagram showing an exemplary system for automating a query for information from a data source or repository, consistent with some disclosed embodiments.

FIG. 2 shows an exemplary system 200 for automating a query for information from a data source or repository, consistent with some disclosed embodiments. The system 200 may include a computer System for Processing Data 210, an orchestrator 212, a request scheduler 214, a data source system 216, a reference repository 218, and metadata 220. A computer System for Processing Data 210 may create a personal data query that is tracked for compliance with certain privacy laws and regulations, such as CPRA and GDPR. System for Processing Data 210 may detect any new personal data query cases, corresponding to new users, and existing cases, corresponding to existing users. A request for the PII may be received by at least one processor from an orchestrator component 212 via a scheduler 214. The new cases may be created by the orchestrator 212, which may create sub-tasks. The scheduler 214 may search the sub-tasks, build the case with correct data and assign it to a service worker. Workers may be allocated in Kubernetes, which itself can load up new workers as needed up to a maximum, at which point a queue is created and jobs begin to pile up, and an alert is given to a human operator, who can manually assign more resources. Kubernetes is an open-source container orchestration system for automating software deployment, scaling, and management. When a new case, corresponding to a new user, is found, work command messages are sent to and from data source systems 216 to each worker to scan repository 218 for the required case response, wherein the response comprises an individual's PII from each of the one or more data storage systems. The metadata 220, comprising summary data of the PII (e.g., zip code, phone number, first name, last name) for each reference repository, relating to how each subsystem stores data, may be stored in a central location. The metadata 220 for each subsystem may include information relating to how to properly format a query to be performed by that subsystem so that results may be retrieved without an error being caused by an improperly formatted query. In some embodiments, orchestrator 212 may retrieve metadata 220 for each subsystem through one or more retrieval protocols and a search request for the PII in each subsystem may be dynamically built to incorporate indications of PII present in a dataset by the metadata 220. In some embodiments, metadata 220 may be automatically gathered into reference repository 218 through a periodic refresh cycle, so that metadata 220 may be referenced by orchestrator 212 through one or more retrieval protocols.

Figure 3:
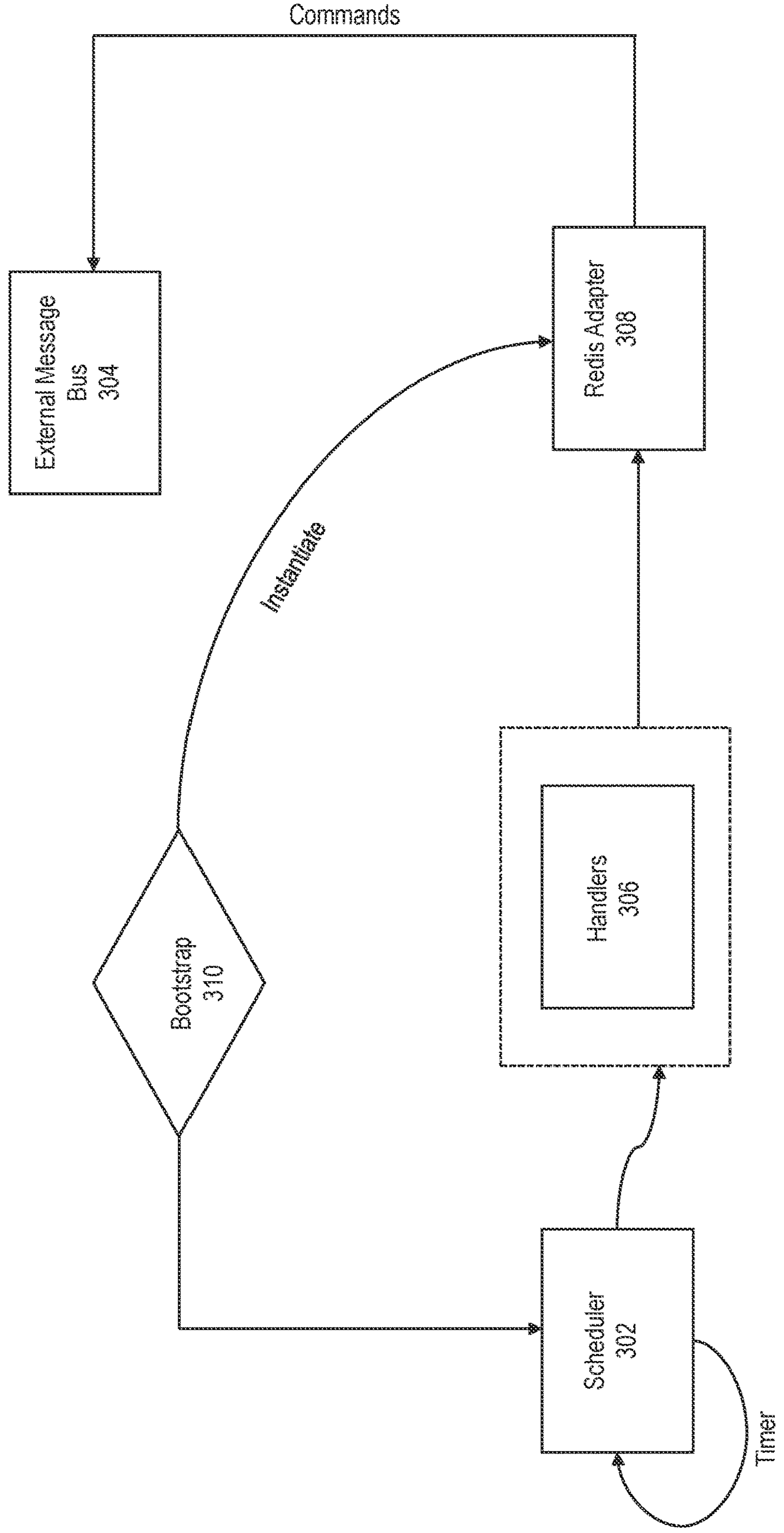
FIG. 3 is a diagram showing an exemplary scheduler service design in connection with a system for automating a query.

FIG. 3 shows an exemplary scheduler service design 300 in connection with the system of FIG. 2. Scheduler service 302 is a singleton service with a high availability configuration that issues commands to the query service based on configured times. In some embodiments, the configured times may be once per hour. In some embodiments, the configured times may be twice per day. In some embodiments, the configured times may be once per day. The scheduler 302 may use static configuration settings to create tasks to send command messages with no other ingestion messages occurring. The scheduler 302 may receive commands from the orchestrator via message bus 304. The scheduler service 302 may issue commands to the message bus 304 and may confirm that action is taken. In some embodiments, the scheduler code may run on a Linux-based docker container. In some embodiments, the scheduler code may be a part of a multi-container PDRQA service. The scheduler may execute the instructions on a timer, sending said instructions to an appropriate handler 306 to be passed via a Redis adapter 308. Bootstrap 310 may provide a centralized way for the application to map handlers to event messages and may perform dependency injection to allow mock testing. In some embodiments, Redis adapter 308 may be used as shared cache. In some embodiments, Redis adapter 308 may be used as a queue to facilitate inter-process communication between microservices. The resulting commands may be passed on to the message bus 304 for dissemination. The scheduler commands may be automated upon the start of the application. When changes to the configuration are detected, the scheduler service may be restarted. In some embodiments, the scheduler service 302 may issue a plurality of commands to the message bus 304. In some embodiments, the scheduler may send a command to refresh the metadata. In some embodiments, the scheduler may send a command to check the due dates of open cases. In some embodiments, the scheduler 302 may send a command to poll the source case system to examine the occurrence of new cases available for processing. In some embodiments, the scheduler 302 may send a command to detect previously scheduled data collection requests. In some embodiments, the scheduler 302 may monitor running job times of existing requests for excessive time length and may terminate or retry the existing request after a predetermined period of time. In some embodiments, the scheduler 302 may send a command to inspect the cache for any result sets awaiting review.

Figure 4:
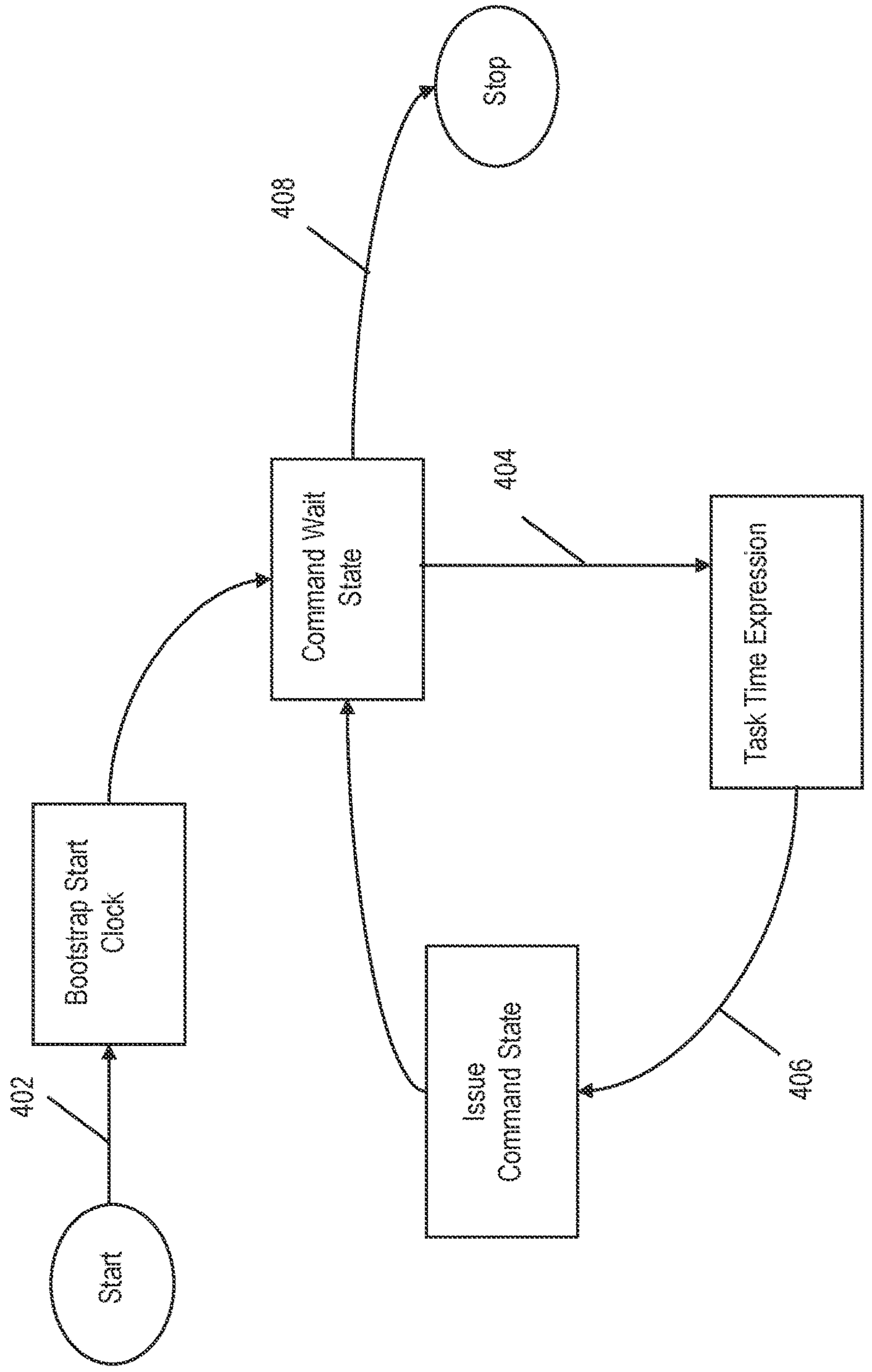
FIG. 4 is a diagram showing an exemplary scheduler finite state workflow in connection with a scheduler of FIG. 3.

FIG. 4 shows an exemplary orchestrator finite state workflow in connection with a scheduler of FIG. 3. Orchestrator may manage finite state workflow for each query by delegating data collection and collating to other microservices. Upon the entry point of a module (Step 402), a scheduler command may be executed. In some embodiments, the scheduler command may receive a pre-configured list of scheduled tasks. The scheduler command may dynamically execute each task to add the list of requests stored by the scheduler object (Step 404) in connection with the system of FIG. 2. The command set may enter a continuous loop where it may remain inactive until the execution of the subsequent request (Step 406). The scheduler may keep track of the pending requests as described below in connection with FIG. 14. Upon completion of a request, the scheduler may receive a command and may publish the command's code to the Redis instance (Step 408). The scheduler then may be inactive until the subsequent command needs to be executed. The scheduler module may utilize the domain.command classes.

Figure 5:
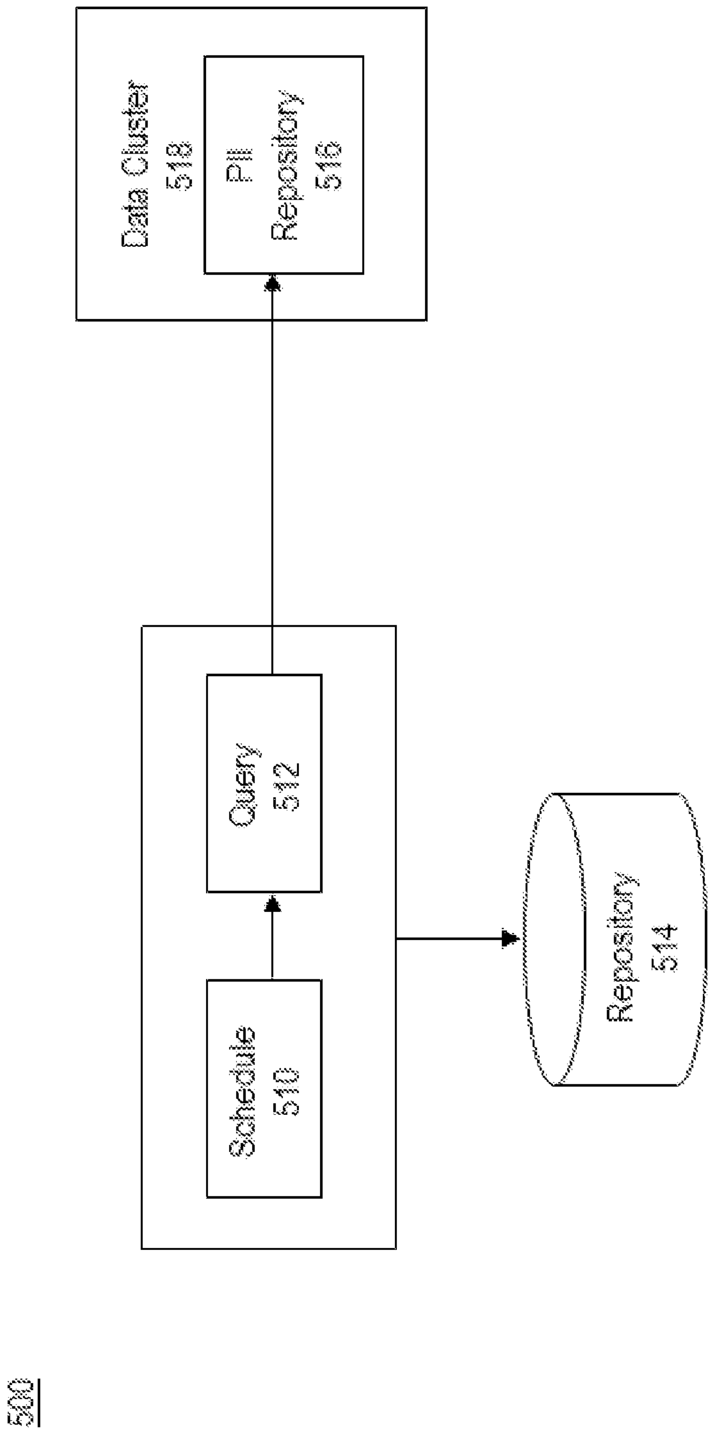
FIG. 5 is a diagram showing a system architecture for scheduling a query, consistent with some disclosed embodiments.

FIG. 5 shows an exemplary system architecture 500 consistent with some disclosed embodiments. The system architecture 500 may include a scheduler 510, a query 512, a repository 514, a data cluster 518, and a PII repository 516. A request Scheduler 510 may schedule a query 512. In some embodiments, query 512 may be used to confirm whether a company stores PII associated with an individual, in compliance with one or more data privacy regulations. In some embodiments, query 512 may lead to the listing or deletion of such personally identifying information, based on a user request and in compliance with one or more controlling data privacy laws. The metadata relating to PII may be stored in a repository 514. The metadata may be collected and organized using a data model. Query 512 may be transferred to PII repository 516 stored in a Data Cluster 518. Query 512 results may be collected and collated in the Data Cluster 518 upon query execution. Query 512 results may be cached in Redis by the collecting microservice after collation. Query 512 results may further await the Scheduler 510 to be retrieved for review. Different subsystems may have different data storage formats. To properly format the query for each subsystem, metadata relating to how each subsystem stores data may be stored in PII repository 516. The metadata for each subsystem may comprise information relating to how to properly format in compliance with certain privacy laws and regulations a query to be performed by that subsystem so that results may be retrieved without an error being caused by an improperly formatted query 512. Metadata for each subsystem may be retrieved and a search request for the PII in each subsystem may be dynamically built based on the metadata. The search request for each subsystem may be built according to the format identified by the metadata and information from the PII request. The dynamically built search request may be executed on each identified subsystem.

Figure 6:
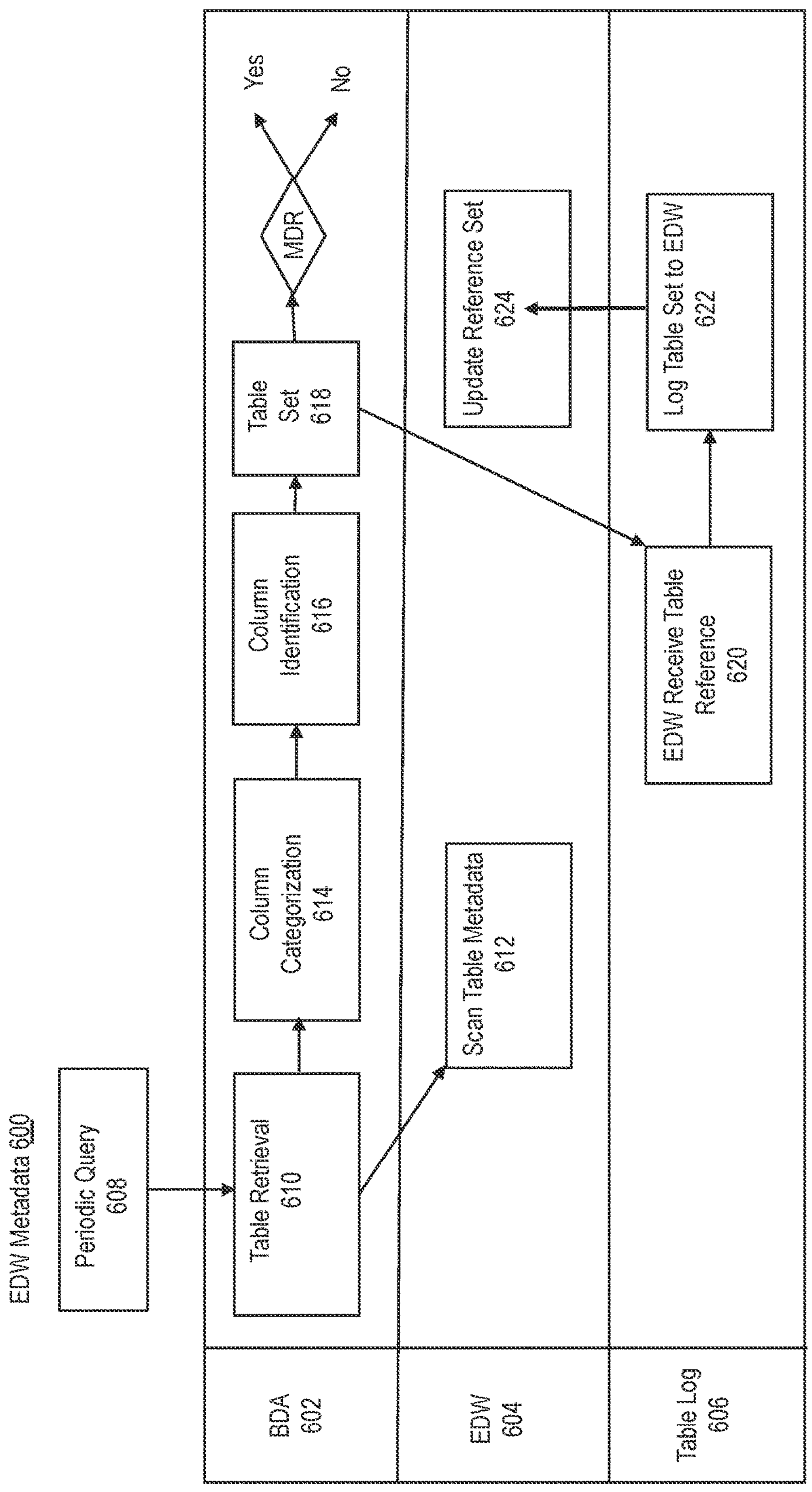
FIG. 6 is a diagram showing an exemplary EDW Metadata workflow in connection with the system of FIG. 5.

FIG. 6 shows an exemplary EDW Metadata workflow in connection with the system of FIG. 5. EDW Metadata workflow 600 describes how the system locates the metadata for the creating the queries. The EDW Metadata workflow 600 may include three repositories (BDA 602, EDW 604, and table log 606). A time-based periodic query 608 instantiates an EDW scan in one of the three repositories (BDA 604). Table log (606) may retrieve tables (610) containing the PII of an individual. The metadata of the retrieved tables may be scanned (612) in one of the repositories (EDW 604). Metadata may be used by the SQL generation system to build a correct statement per repository. Column categorization (614) algorithms may be applied to the retrieved tables containing the PII. Column identification (616) results may be saved in a repository. The resulting table set (618) containing the PII may be submitted. On the determination that MDR (Mnemonic Data Retrieval) is successful, the request may be logged by the data owner ("Yes" branch). On the determination that MDR is unsuccessful, the request may be rerun ("No" branch). Alternatively, on the determination that MDR is unsuccessful, the process may throw an exception. In some embodiments, the exception may stop the process, and the user may be informed that the data retrieval was unsuccessful. The resulting table set containing the PII may be updated in the table log (606). An EDW table reference (620) may be received via an API method. The reference table set (622) may be logged to EDW and the update may be terminated. Alternatively, the reference table set may be updated (624) prior to the update termination.

Figure 7:
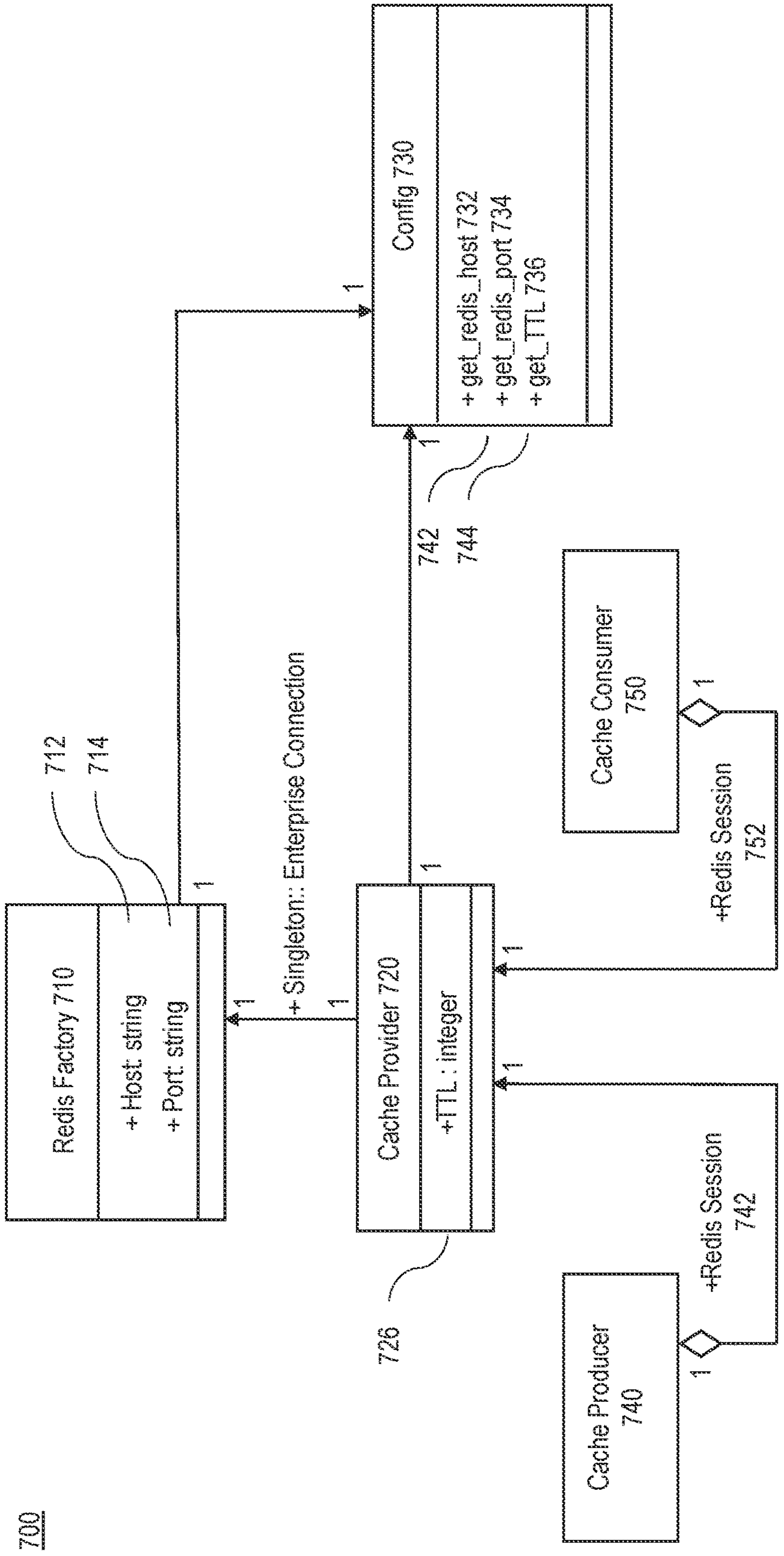
FIG. 7 is a diagram showing an exemplary cache configuration, consistent with some disclosed embodiments.

FIG. 7 shows an exemplary cache configuration 700 as a software implementation, consistent with some disclosed embodiments. In some embodiments, Cache configuration 700 may include a Redis factory 710, a cache provider 720, Redis host 732, Redis port 734, time to live (TTL) 736, cache producer 740, Redis session 742, cache consumer 750, and Redis session 752. Redis is an open-source in-memory storage, used as a distributed, in-memory key-value database, cache and message broker, with optional durability. PII caching in response to user queries may be managed through a Redis factory 710 or other similar cache management system, which may comprise host 712 and port 714 variables that may be implemented as strings. In some such embodiments, Redis factory 710 may be implemented using a cache provider 420 that may be designed using the singleton data structure to prevent more than one cache providers 720 being associated with a given Redis factory 710. In such embodiments, the association between Redis factory 710 and cache provider 720 may be an enterprise connection. And, in such embodiments, cache provider 720 may comprise a time to live (TTL) variable implemented as an integer. In some embodiments, Redis factory 710 and/or cache provider 720 may be configured using configuration instructions 730 that may comprise Redis host 732, Redis port 734, and TTL 736. In such embodiments, TTL 736 may be an integer that may control caching duration and may range from minutes to days based on the expected frequency of cache updates. In some embodiments, a cache may be created by cache producer 740 using Redis session 742. In such embodiments, each cache producer 440 may be associated with a single cache provider 720. In some embodiments, a cache may be consumed by cache consumer 750 using Redis session 752. In such embodiments, each cache consumer 750 may be associated with a single cache provider 720. In some embodiments, cache consumer 750 may deliver query results in compliance with one or more data privacy regulations.

Figure 8:
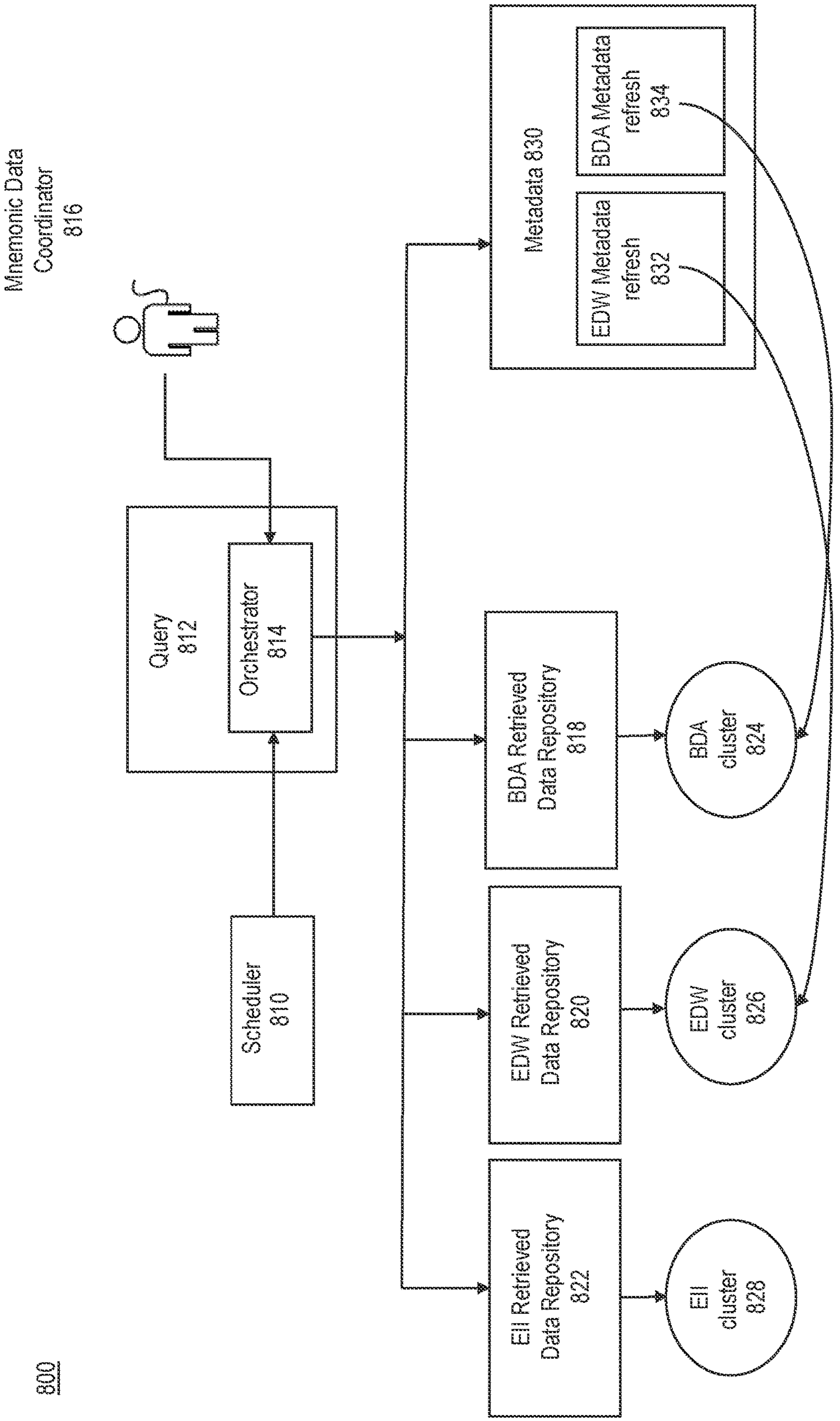
FIG. 8 is a diagram showing an exemplary microservice operation, consistent with some disclosed embodiments.

FIG. 8 shows an exemplary microservice operation designed to independently manage PII data query as a black-box implementation in line with object-oriented design standards, consistent with some disclosed embodiments. Scheduler 810 may schedule a query 812. In some embodiments, scheduler 810 may communicate with an orchestrator service 814 to schedule query 812. In such embodiments, the orchestrator service 814 may use metadata 830 to dynamically generate a query. The data retrieved as described above, in response to a query, may be stored in any of the plurality of the retrieved data repositories 818, 820, or 822 as described above. The retrieved data may be stored in any of the plurality of data retrieval subsystems (BDA 818, EDW 820, EII 822), each associated with a different required case response. The retrieved data may be transferred to a cluster (BDA cluster 824, EDW cluster 826, EII cluster 828). In some embodiments, scheduler 810 may instantiate a query 812 to any of the plurality of the retrieved data repositories 818, 820, or 822 and may collect metadata 830, which may include information about the PII repositories for use by retrieved data repository services. To properly format the query for each subsystem, metadata 830 relating to how each subsystem stores data may be stored in a central location. The metadata for each subsystem may comprise information relating to how to properly format a query 812 to be performed by that subsystem so that results may be retrieved without an error being caused by an improperly formatted query. Metadata 830 for each subsystem may be retrieved and a search request for the PII in each subsystem may be dynamically built based on the metadata 830. The search request for each subsystem may be built according to the format identified by the metadata 830 and information from the PII request. The dynamically built search request may be executed on each identified subsystem. Metadata 830 may be used by the SQL generation system to build a correct statement per repository. In some embodiments, metadata may be automatically gathered into the reference repository through a periodic refresh cycle (EDW Metadata refresh (832), BDA Metadata refresh (834)), so that metadata may be referenced by the orchestrator through one or more retrieval protocols.

Figure 9:
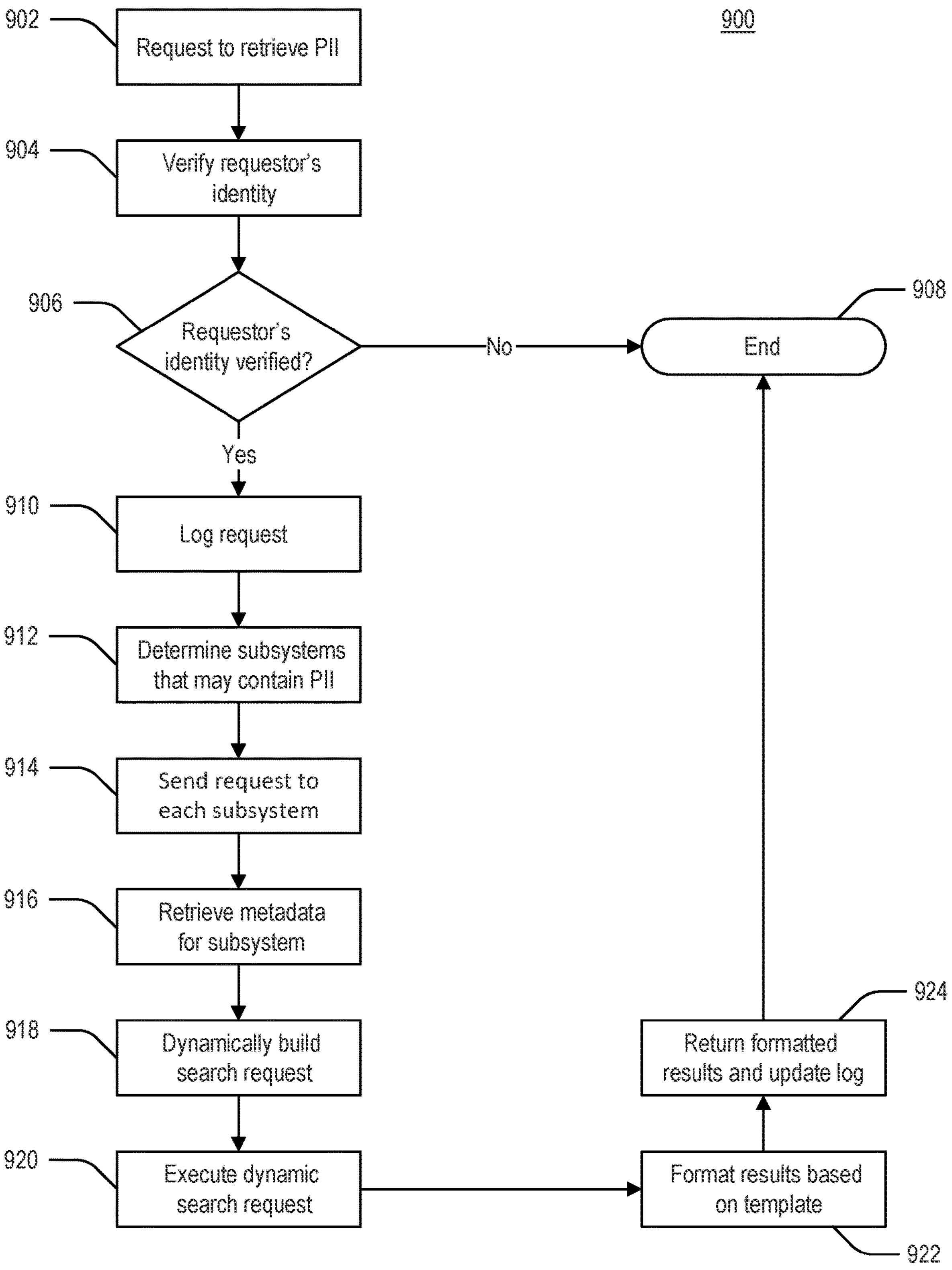
FIG. 9 is a flowchart of an exemplary method for processing a request to retrieve personally identifiable information, consistent with some disclosed embodiments.

FIG. 9 depicts a flowchart of an exemplary method 900 for processing a request to retrieve personally identifiable information, consistent with some disclosed embodiments. An exemplary method 900 may be executed by a processor. A request to retrieve PII may be received from a requestor (i.e., an individual) (step 902). For example, the individual may submit a request for their PII via an electronic mail message (e.g., from a communication device of the requestor, such as a desktop computer, a laptop computer, a mobile phone, or a tablet), an electronic form provided by the data owner, entering a form on a website, placing a call, a spoken/in-person request, a letter, or the like. In one embodiment, the electronic form may be an electronic request page that may request certain information needed to search for PII, such as name, account number, birthday of the individual, or the like.

The requestor's identity may be verified (step 904). The requestor's identity may be verified using any user authentication technique, including but not limited to, a password, multi-factor authentication, certificate-based authentication, biometric authentication, or token-based authentication. A password corresponds to a string of characters that allows access to a computer system or service. Multi-factor authentication is a multi-step account login process that requires users to enter more information than just a password. Certificate-based authentication is a login process using a digital certificate derived from cryptography to identify a user, device or machine, before granting access to an application, network or other resource. Biometric authentication refers to a cybersecurity process that verifies a user's identity using their unique biological traits such as fingerprints, voices, retinas, and facial features. Token-based authentication is a protocol that generates encrypted security tokens. In some embodiments, the requestor's identity may be verified using a single data element, such as a unique identifier issued to the requestor. For example, the single data element may include an account number of the requestor, the account number being associated with the data owner. In other embodiments, the requestor's identity may be verified using a primary data element and a secondary data element. For example, the primary data element may include any one of: a unique identifier issued to the requestor, a Social Security Number of the requestor, a complete name of the requestor, a driver's license number of the requestor, a passport number of the requestor, or a unique identification number from an official government-issued document. For example, the secondary data element may include any one or more of: a telephone number of the requestor, a full address of the requestor, an electronic mail address of the requestor, or an account number of the requestor. The system may have a reference database with a subset of this data for each person. If the requestor's primary and secondary data elements match what the system has in its database, the identity may be verified.

If the requestor's identity is not verified (step 906, "no" branch), the method 900 may terminate (step 908). If the requestor's identity is verified (step 906, "yes" branch), the request to retrieve PII may be logged by the data owner, storing the PII (step 910). Logging is performed automatically by the orchestrator service after the system receives a PII query. Logging is performed to show compliance with data privacy laws. The log may be used by the data owner to track PII requests, including who submitted the request (e.g., the identity of the requestor), when the request was submitted (e.g., a time stamp), and the results of the request (which will be described further below). The log may assign a generic identifier (e.g., a serially incrementing value) to each request to track completion of the request. The log itself may not store any PII. In some embodiments, the log may include the generic identifier and a list of databases or data stores that are searched for the requested PII. The log may be used by the data owner to help prove compliance with privacy regulations and associated reporting requirements.

The system may make a determination of which subsystems are likely to contain PII responsive to the request. Further, the system may search the subsystems. A determination may be made to identify subsystems that may contain the PII indicated in the request (step 912). Depending on how the data owner has structured their internal systems, the requested PII may reside in several different systems. For example, the PII may exist in multiple different databases (or other type of data storage), as may be the case with a bank customer having several different accounts with the bank (e.g., a checking account, a savings account, and a credit card). The relevant PII associated with each account may reside in a different data storage of the bank. In some embodiments, after the subsystems that may contain the PII are identified, a list of the identified subsystems may be added to the log.

Once all the subsystems that may contain the PII are determined, a request may be sent by the orchestrator to each subsystem to retrieve the PII (step 914). It is noted that while an identified subsystem may contain PII, the identified subsystem may in fact not contain any PII related to the requestor. For example, if the requestor had a credit card with a bank that was closed years ago, the bank may have already deleted the data relating to the credit card account.

Different subsystems may have different data storage formats. As such, it may be difficult to format a generic request that can be sent to all subsystems. For example, a first database may store an individual's name in the format "FirstName=X, LastName=Y" while a second database may store the individual's name in the format "Name=X Z Y," where X is the individual's first name, Y is the individual's last name, and Z is the individual's middle initial or middle name. To properly format the query (or request) for each subsystem, metadata relating to how each subsystem stores data may be stored in a central location (e.g., in a query coordinator component or in a metadata database). The metadata for each subsystem may comprise PII data field information relating to how to properly format a query to be performed by that subsystem so that results may be retrieved without an error being caused by an improperly formatted query (e.g., a syntax error in an SQL query). Metadata for each subsystem may be retrieved (step 916) and a search request for the PII in each subsystem may be dynamically built based on the metadata (step 918). The search request for each subsystem may be built according to the format identified by the metadata and information from the PII request. Metadata may be used by the SQL generation system to build a correct statement per repository. The dynamically built search request may be executed on each identified subsystem (step 920), as explained below.

As noted above, different subsystems may have different data storage formats and therefore the query results returned by each subsystem may also have a different format. To uniformly present the search results to the requestor, the search results may be formatted based on a template (step 922). For example, the template may define a reporting format, such as a screen layout or a document template. For example, the template may format the results in a delimiter-separated values (CSV) format. Delimiters frequently used include the comma, tab, space, and semicolon. The search results may then be inserted into the layout or template according to data fields in the search results and corresponding data field labels in the layout or template. Continuing the above example using the individual's name, the template may define the individual's name to be presented as "LastName, FirstName, MiddleInitial." Regardless of the format used by the respective databases that are searched, the search results will be presented in the format based on the template. In some embodiments, the template may be defined by the data owner and all requestors receive their search results in a format based on the same template. In other embodiments, the requestor may select from one or more predefined templates provided by the data owner and the search results are formatted based on the selected predefined template.

The search results may be filtered and/or additionally processed to remove duplicate information (i.e., the search results may be de-duplicated). For example, if the same information about the requestor appears in three different databases of the data owner, the information may only be included once in the search results. As another example, the de-duplicated information may be included once in the search results and there may be an additional section of the search results to indicate which databases the duplicated information appears in. For example, the search results may indicate that the included information is from database DB1 and is also found in database DB4 and database DB6.

The search results may be filtered to mask certain PII fields. For example, the requestor's Social Security Number may be indicated in the search results that it was found in one or more databases, but the requestor's actual Social Security Number may not be included in the search results. For example, the requestor's Social Security Number may be displayed in the search results as "Social Security Number: XXX-XX-XXXX."

The formatted search results may be returned to the requestor and the log may be updated (step 924). The log may be updated to show compliance with data privacy laws. If the search spanned several subsystems, the log may be updated to identify each subsystem that received the search request and each subsystem that returned results. For example, if the requestor was searching for PII from a bank and the requestor has a current checking account, a current savings account, and a closed credit card account, the results may include the information corresponding to the current checking account and the current savings account. The results may also include an indication that the credit card account has been closed and the date that the credit card account was closed. The log may be similarly updated to reflect the results (e.g., that information relating to the checking account and savings account were found and that the credit card account was closed). After the formatted results are returned to the requestor and the log is updated, the method 900 may terminate (step 908).

Figure 10A:
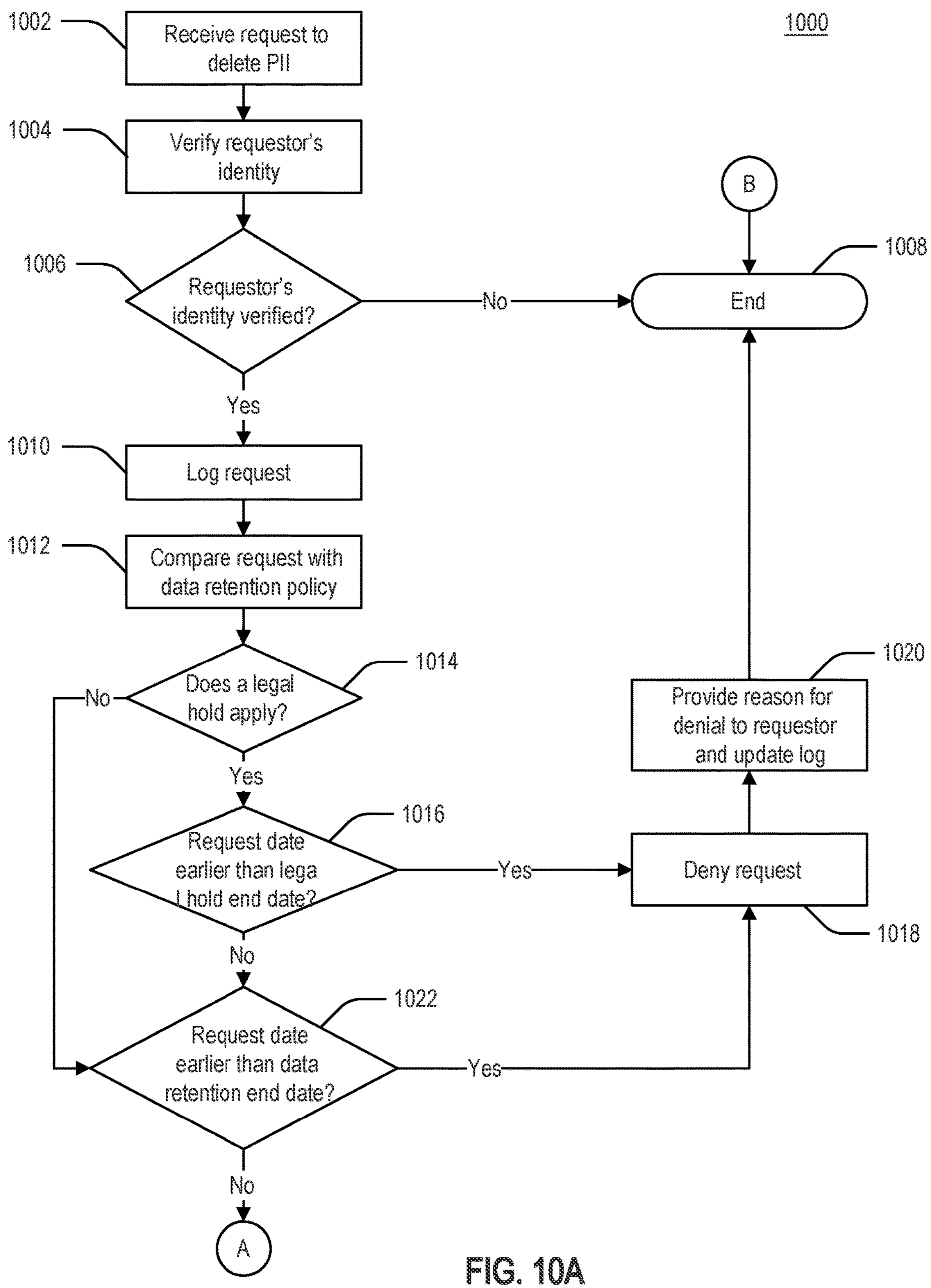
FIGS. 10A and 10B are flowcharts of an exemplary method for processing a request to delete personally identifiable information, consistent with some disclosed embodiments.
Figure 10B:
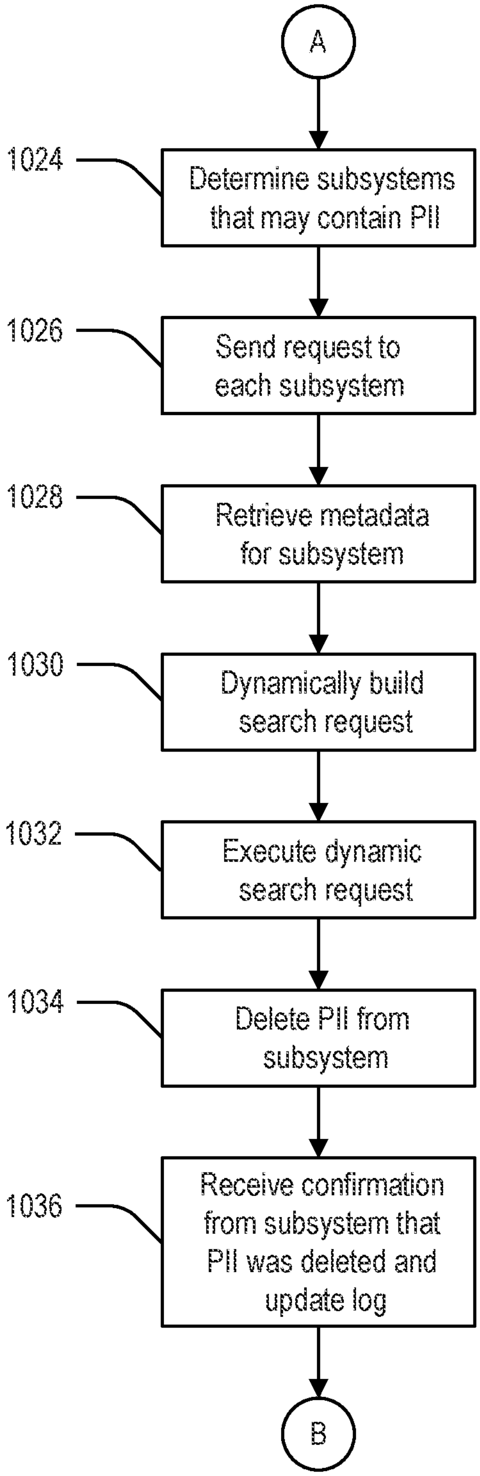

FIGS. 10A and 10B depict flowcharts of an exemplary method 1000 for processing a request to delete personally identifiable information, in accordance with some embodiments. A request to delete PII may be received from a requestor (i.e., an individual) (step 1002). For example, the individual may submit a request to delete their PII via an electronic mail message or an electronic form provided by the data owner, similar to the manner of submitting a request as described above in connection with FIG. 9. The requestor's identity may be verified (step 1004). The requestor's identity may be verified using any method described above, for example, for step 904 of FIG. 9. If the requestor's identity is not verified (step 1006, "no" branch), the method 1000 may terminate (step 1008).

If the requestor's identity is verified (step 1006, "yes" branch), the request to delete PII may be logged by the data owner (step 1010). The log may be used by the data owner to track PII requests in a similar manner as the log described above, for example, for step 910 of FIG. 9.

The request to delete the PII may be compared with a data retention policy of the data owner, which includes a data retention end date (step 1012). The data retention policy may also be referred to as an information lifecycle management policy. In some embodiments, the data retention policy may be stored in a database. The data retention policy may define, among other items, how the data is stored, how long the data is stored, how the data is deleted, and whether there is a legal hold applicable to the data. The data may be stored in a database. There may be specific state, federal, and industry laws and regulations that may affect the data retention policy. In some circumstances, a legal hold (e.g., a litigation-related document retention requirement) may require that certain data be retained for a longer period of time than the existing data retention policy. The legal hold may include information relating to the legal hold, for example, a legal case identifier (such as a numeric code or an alphanumeric code) and a legal hold end date, the date at which the legal hold expires.

A determination may be made whether a legal hold applies to the requested PII (step 1014). If a legal hold applies to the requested PII (step 1014, "yes" branch), then a determination may be made whether the date of the request (i.e., the date on which the request to delete the PII was submitted) is earlier than the legal hold end date (step 1016). For example, if the request to delete is submitted on Feb. 18, 2023, and the legal hold end date is Dec. 31, 2024, then the request to delete would be earlier than the legal hold end date. If the date of the request is earlier than the legal hold end date (step 1016, "yes" branch), then the request to delete the PII may be denied because the date of the request is earlier than the legal hold end date (step 1018). The requestor may be provided with information relating to the reason for the denial and the log may be updated (step 1020). The log may be updated to show compliance with data privacy laws. The method 1000 then may terminate (step 1008).

If a legal hold does not apply to the requested PII (step 1014, "no" branch) or if the date of request is not earlier than the legal hold end date (step 1016, "no" branch), then a determination may be made whether the request date is earlier than the data retention end date (step 1022). As noted above, the data retention policy may include a length of time that the data owner retains the data (e.g., five years from the date of data creation). If the request date is earlier than the data retention end date (step 1022, "yes" branch), then the request to delete the PII may be denied because the date of the request is earlier than the data retention end date (step 1018). The requestor may be provided with information relating to the reason for the denial and the log may be updated (step 1020) as discussed above with respect to steps 1018 and 1020. The method 1000 may then terminate (step 708).

In some embodiments, if the request date is earlier than the data retention end date (step 1022, "yes" branch), then the request may be placed into a queue to be processed on the data retention end date. A response may be generated and sent to the requestor indicating that the request cannot be processed at this time because the date of the request is earlier than the data retention end date and that the request will automatically be processed on the data retention end date. In some embodiments, this option may be selected by the data owner. In other embodiments, the requestor may be presented with an option to place the request in a queue to be processed on the data retention end date. For example, the option may be presented to the requestor via a graphical user interface on the requestor's communication device.

On a condition that the requestor has an active account with the data owner (e.g., the requestor submitted a request to their bank to delete their account information but currently has an active checking account with funds in the account), a data retention end date may not be set because of the active status of the account. In such circumstances, the request to delete the PII may be denied because of the active status of the account.

If the request date is not earlier than the data retention end date (step 1022, "no" branch), then the subsystems that may contain the PII indicated in the request may be determined (step 1024). Depending on how the data owner has structured their internal systems, the requested PII may reside in several different systems or subsystems. For example, the PII may exist in multiple different databases (or other type of data storage), such as a bank customer having several different accounts with the bank (e.g., a checking account, a savings account, and a credit card). The relevant PII associated with each account may reside in a different data storage of the bank.

A graphical representation of all the subsystems that are determined to contain one or more pieces of the requested PII may be created. The graphical representation may then be displayed to a user on the data owner's side.

Once all the subsystems that may contain the PII are determined, a request may be sent to each subsystem to delete the PII in that subsystem (step 1026). It is noted that while an identified subsystem may contain PII, the identified subsystem may in fact not contain any PII related to the requestor. For example, if the requestor had a credit card with a bank that was closed years ago, the bank may have already deleted the data relating to the credit card account. In such circumstances, the subsystem that has the data relating to the credit card account does not include any PII to be deleted. The subsystem may return an indication that the data relating to the PII was previously deleted, including a date on which the data was deleted. This indication may be provided to the requestor.

Different subsystems may have different data storage formats. To properly format the query for each subsystem, metadata relating to how each subsystem stores data may be stored in a central location (e.g., in a query coordinator component or in a metadata database). The metadata for each subsystem may include information relating to how to properly format a query to be performed by that subsystem so that results may be retrieved without an error being caused by an improperly formatted query (e.g., a syntax error in an SQL query). Metadata for each subsystem may be retrieved (step 1028) and a search request for the PII in each subsystem may be dynamically built based on the metadata (step 1030). The dynamically built search request may be executed on each identified subsystem (step 1032).

If the PII is found in the subsystem, then the requested PII may be deleted (step 1034). A confirmation may be received from each subsystem that the PII has been deleted from the subsystem and the log is updated (step 1036). The method 1000 may then terminate (step 1008).

Figure 11:
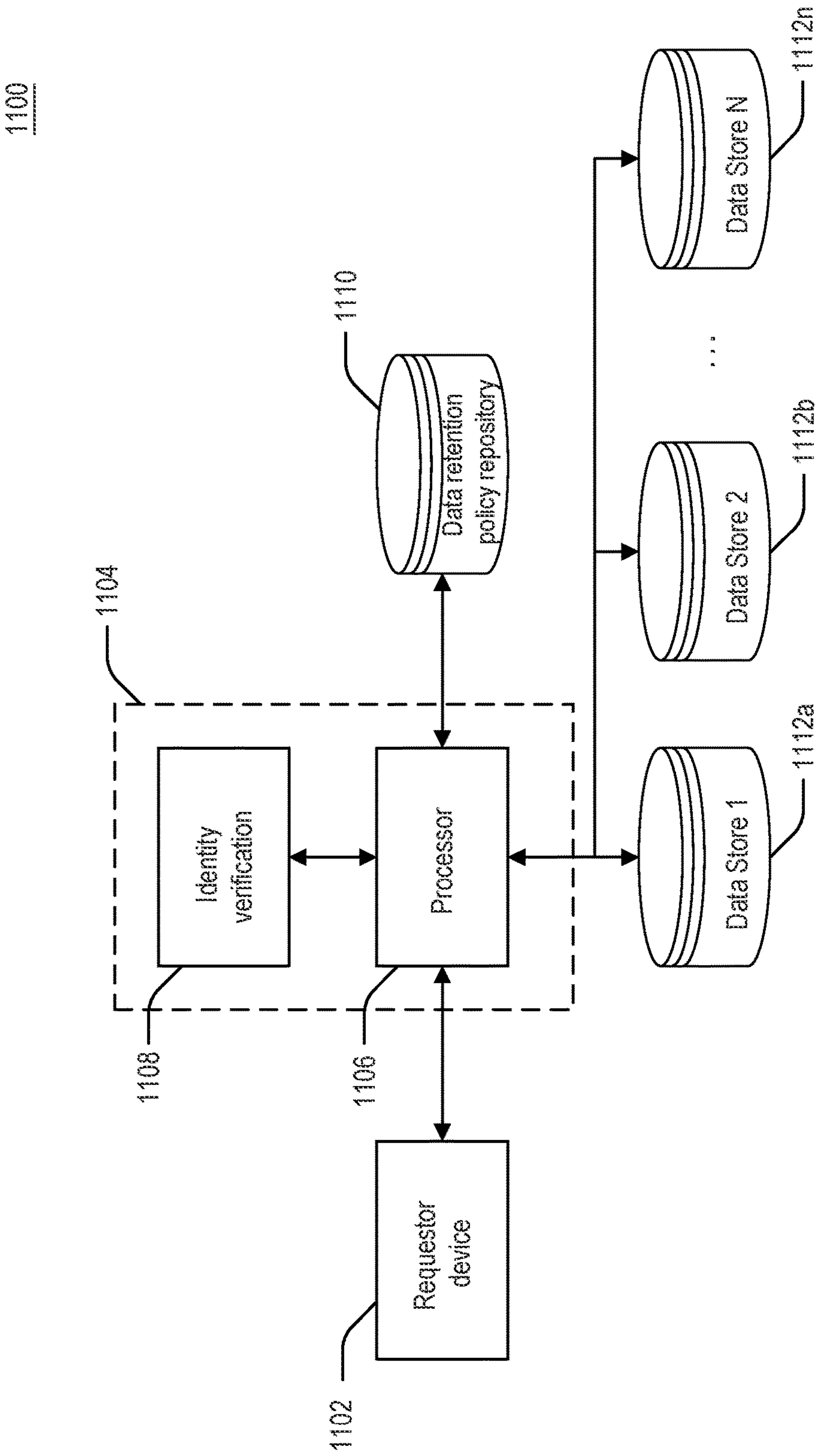
FIG. 11 is a block diagram of an exemplary system for processing personally identifiable information, consistent with some disclosed embodiments.

A system for processing personally identifiable information is provided. FIG. 11 depicts a block diagram of a system 1100 for processing personally identifiable information, consistent with some disclosed embodiments. The system 1100 may comprise a requestor device 1102, system 1104 of a data owner, a processor 1106 and an identity verification component 1108. When the special service detects that an event has been added to the special queue, the special service may restage the event from the special queue to the queue (e.g., the special service moves the event from the special queue to the first queue). A retry counter may be associated with each event in the special queue, wherein the special service is further configured to restage the event from the special queue to the queue, on a condition that the retry counter is below a threshold and flag the event in the special queue for separate handling, on a condition that the retry counter exceeds the threshold. A requestor device 1102 may include a communication device of the requestor, such as an electronic computational and/or telecommunications device (a desktop computer, a laptop computer, a mobile phone, or a tablet, a smartwatch, smart glasses, AR and/or VR glasses, and the like). The requestor device 1102 may be configured to access a system 1104 of a data owner. The system 1104 may include a processor 1106 and an identity verification component 1108. The processor 1106 may include any suitable computing device configured to perform operations, including, but not limited to, a central processing unit (CPU) having one or more cores, a graphics processing unit (GPU) having one or more cores, anASIC, FPGA, or any combination thereof. The identity verification component 1108 may be configured to verify the identity of a requestor, using any of the methods described above in connection with FIG. 9. The identity verification component 1108 may be implemented as a hardware component (e.g., a specialized processor), a software component (e.g., a separate set of instructions to be executed by the processor 1106), or a combination of hardware and software.

A data retention policy repository 1110 may be stored in a database or other type of data storage. The data retention policy 1110 may be accessed by the processor 1106. A plurality of data stores (e.g., data store 1 1112*a*, data store 2 1112*b*, . . . data store N 1112*n*) may be in communication with the processor 1106. It is noted that while system 1104 is depicted in FIG. 11 to include the processor 1106 and the identity verification component 1108, the system 1104 may also include data retention policy 1110 and/or data stores 1112*a*-1112*n*.

In operation, the requestor may use the requestor device 1102 to submit a request for PII. The request for PII may include a request to retrieve the PII (i.e., for the requestor to see what PII that the data owner has stored), a request to delete the PII, or a request to update the PII. The requestor may use the requestor device 1102 to send an electronic mail message to the system 1104 or to complete an electronic form provided by the system 1104.

Upon receiving the request, the processor 1106 may communicate with the identity verification component 1108 to verify the identity of the requestor. The identity verification component 1108 may use any of the methods described above in connection with FIG. 9 to verify the requestor's identity. The system 1100 may be configured to perform the method 900 and/or the method 1000 as described above in connection with retrieving the requestor's PII or deleting the requestor's PII, respectively.

A similar method may be performed to update the requestor's PII. The request submitted by the requestor device 1102 may include a request to update or correct one or more items of the requestor's PII. To determine the requestor's current PII stored by the data owner, the method 900 may be performed to retrieve the requestor's PII. After the requestor's PII has been retrieved, it may be displayed to the requestor via a graphical user interface generated by the processor 1106 and displayed on the requestor device 1102. From the graphical user interface, the requestor may edit certain data fields of PII. For example, the requestor may edit the requestor's home address. In some embodiments, the requestor may only be permitted to edit certain data fields, as may be determined by the data owner or by applicable privacy regulations. In some embodiments, the requestor may submit a proposed change to their PII which may need to be verified by the data owner before the change can be made.

The request initially submitted by the requestor may include the information to be changed (e.g., the initial request may include the requestor's new home address). If the requestor's identity is verified, the system 1104 may automatically update the data stores 1112*a*-1112*n* with the requestor's new home address without requiring further input from the requestor. Every data store having PII must be updated in the case of a delete request.

Figure 12:
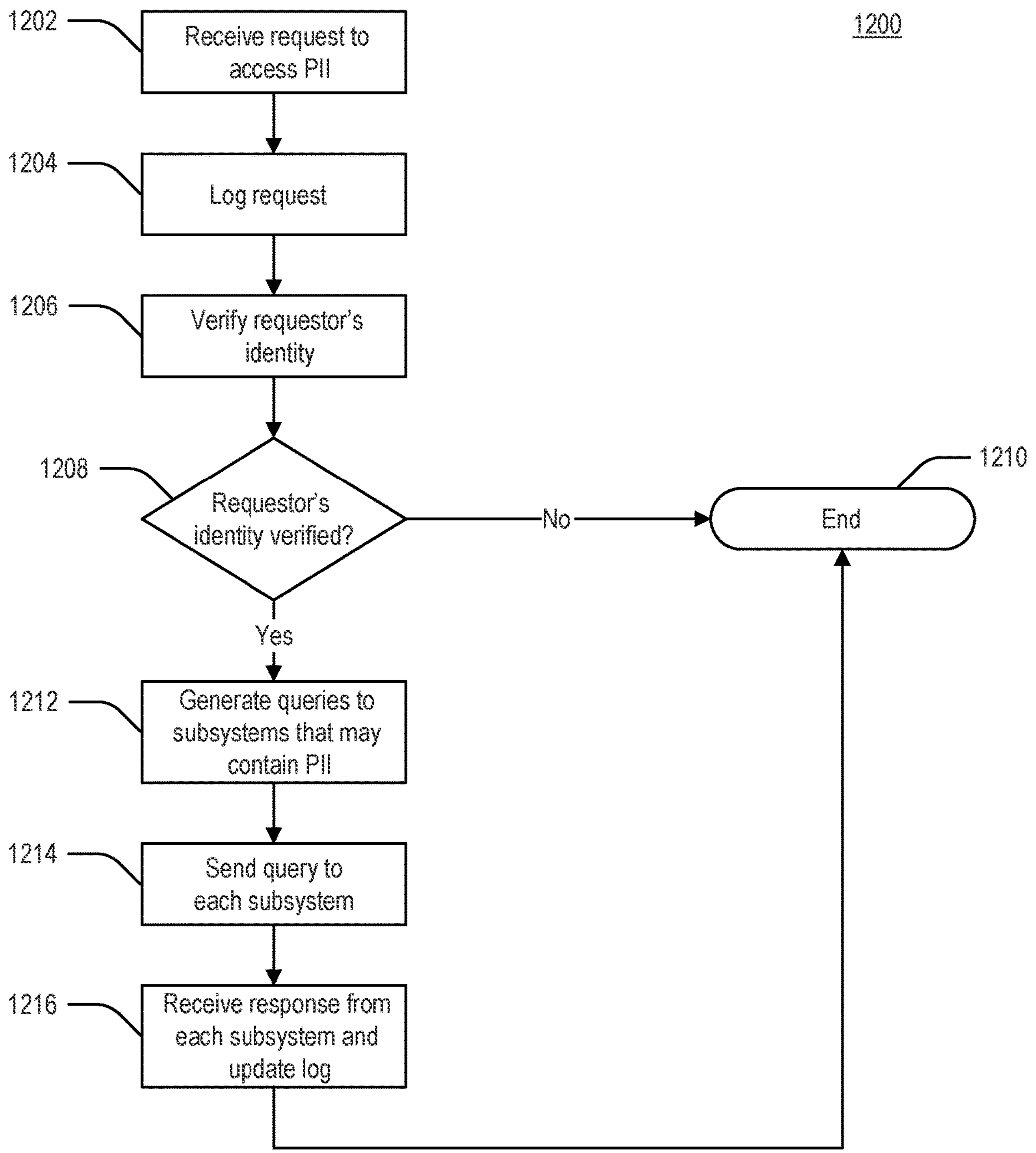
FIG. 12 is a flowchart of an exemplary method for processing a request to access personally identifiable information, consistent with some disclosed embodiments.

FIG. 12 depicts a flowchart of an exemplary method 1200 for processing a request to access personally identifiable information, consistent with some disclosed embodiments. A request to access personally identifiable information (PII) may be received from a requestor (i.e., an individual) (step 1202). For example, the individual may submit a request to access their PII via an electronic mail message (e.g., from a communication device of the requestor, such as a desktop computer, a laptop computer, a mobile phone, or a tablet) or an electronic form provided by the data owner. The processes performed in step 1202 may be similar to, for example, step 902 of process 900.

The request to access PII may be logged by the data owner (step 1204). The log may be used by the data owner in a similar manner as described above in connection with FIG. 9. The processes performed in step 1204 may be similar to, for example, step 904 of process 900. In some embodiments, a progress dashboard may be created and displayed to a user in a similar manner as described above in connection with FIG. 9.

The requestor's identity may be verified (step 1206). The requestor's identity may be verified using any user authentication technique as described above in connection with FIG. 9. The processes performed in step 906 may be similar to, for example, step 906 of process 900. If the requestor's identity is not verified (step 1208, "no" branch), the method 1200 may terminate (step 1210).

If the requestor's identity is verified (step 1208, "yes" branch), queries may be generated to be sent to different subsystems that may contain the PII indicated in the request (step 1212). Depending on how the data owner has structured their internal systems, the requested PII may reside in several different systems. For example, the PII may exist in multiple different databases (or other type of data storage), such as a bank customer having several different accounts with the bank (e.g., a checking account, a savings account, and a credit card). The relevant PII associated with each account may reside in a different data storage of the bank. The processes performed in steps 1208 and 1212 may be similar to, for example, step 908 of process 900.

Once all the queries for the different subsystems that may contain the PII are generated, the requests may be sent to each subsystem to retrieve the PII (step 1214). The processes performed in step 1214 may be similar to, for example, step 916 of process 900. It is noted that while an identified subsystem may contain PII, the identified subsystem may in fact not contain any PII related to the requestor. For example, if the requestor had a credit card with a bank that was closed years ago, the bank may have already deleted the data relating to the credit card account.

A response may be received from each queried subsystem, with the response including the requested PII and the log may be updated (step 1216). The method 1200 may then terminate (step 1210). The processes performed in step 1216 may be similar to, for example, step 924 of process 900.

Figure 13:
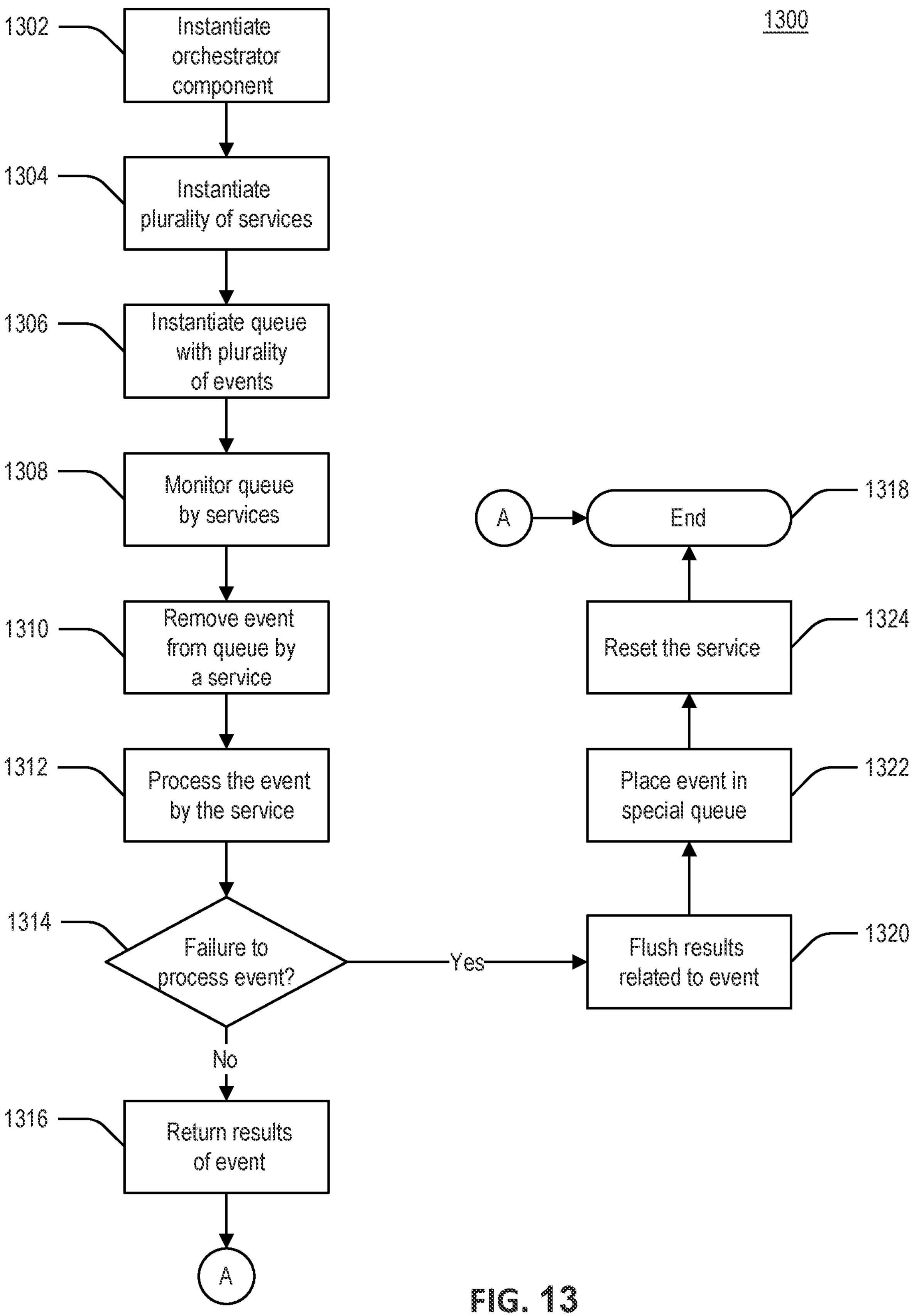
FIG. 13 is a flowchart of an exemplary method for processing data across a plurality of services, consistent with some disclosed embodiments.

FIG. 13 depicts a flowchart of an exemplary method 1300 for processing data across a plurality of services, consistent with some disclosed embodiments. The stored instructions may configure the processor to implement an orchestrator component configured to coordinate data traffic to each of the plurality of services and generate and maintain a queue configured to store a plurality of events including the data to be processed. Each of the plurality of services may be configured to monitor the queue; remove an event from the queue; process the event, wherein the each of the plurality of services may process one event at a time; and may return results of the event to a central data store. Responsive to a determination of a failure to process the event, the processor may be configured to flush any results related to the event, place the event in a special queue, and reset the service to enable the service to process another event. An orchestrator component may be instantiated (step 1302). In some embodiments, the orchestrator component may be implemented as software code. Instantiating the orchestrator component may include creating a software object or executing the software code. The orchestrator is an event-driven system. The orchestrator component may coordinate other components and services for processing data. A plurality of services may be instantiated (step 1304). In some embodiments, each of the plurality of services may provide a different service to process data. For example, a first service may verify a user's identity, a second service may build and return a search request, and a third service may execute the search request and format the search results. Other types of services are possible within the scope of the present disclosure. In other embodiments, each of the plurality of services may be configured to perform multiple functions. In some embodiments, the services may exchange data with each other directly, via the orchestrator component, or via a data store accessible by the services.

A first queue (for example, a linear data structure configured to store a plurality of elements) comprising a plurality of events may be instantiated (step 1306). An event is an action or occurrence recognized by software. For example, the first queue may include data to be processed, with each event in the first queue including a separate data element. A data element is a basic unit of information that has a unique meaning and subcategories (data items) of distinct value. The first queue may be monitored by the plurality of services, so the services know when there are events to be processed (step 1308). An event may be removed from the first queue by a service of the plurality of services (step 1310) and the service may process the event (step 1312) by tracking and analyzing data streams.

A determination may be made whether the service fails to process the event (step 1314). The service may fail to process the event for a number of reasons, including, but not limited to, an error in the data that prevents the event from being processed, the service crashes or otherwise fails to execute, or the service times out (i.e., it takes too long for results to be returned from the service). If the service does not fail to process the event (i.e., the event is successfully processed) (step 1314, "no" branch), then the results of the event may be returned to the orchestrator component (step 1316). In some embodiments, the results of the event may be stored in a central data store. The results of the event may be returned by the one service to a central data store. On a condition that the one service indicates a failure to process the event, any results related to the event may be flushed by the at least one processor, the event may be placed in a special queue by the at least one processor, and the one service may be reset by the at least one processor to enable the one service to process another event. The method 1300 may then terminate (step 1318).

If the service fails to process the event (step 1314, "yes" branch), then any results related to the event may be flushed or otherwise discarded (step 1320). The failed event may be then placed in a special queue (step 1322). For example, the special queue may be a separate event queue configured to store events that were not previously successfully processed. The event would not be processed on the occasion if the request is made during a legal hold or the event lacks information from the user. If the request is made during a legal hold, the event is tolled until the legal hold lifts. If the event lacks information from the user, the system may ask the user for more information. In some embodiments, events in the special queue may have a higher priority than other events for servicing, so that higher priority events from this queue may be processed before lower priority events. The failed service may be reset (step 1324) and the method 1300 may terminate (step 1318). Responsive to a determination of a failure to process the event, the processor may be configured to flush any results related to the event, place the event in a special queue, and reset the service to enable the service to process another event.

Figure 14:
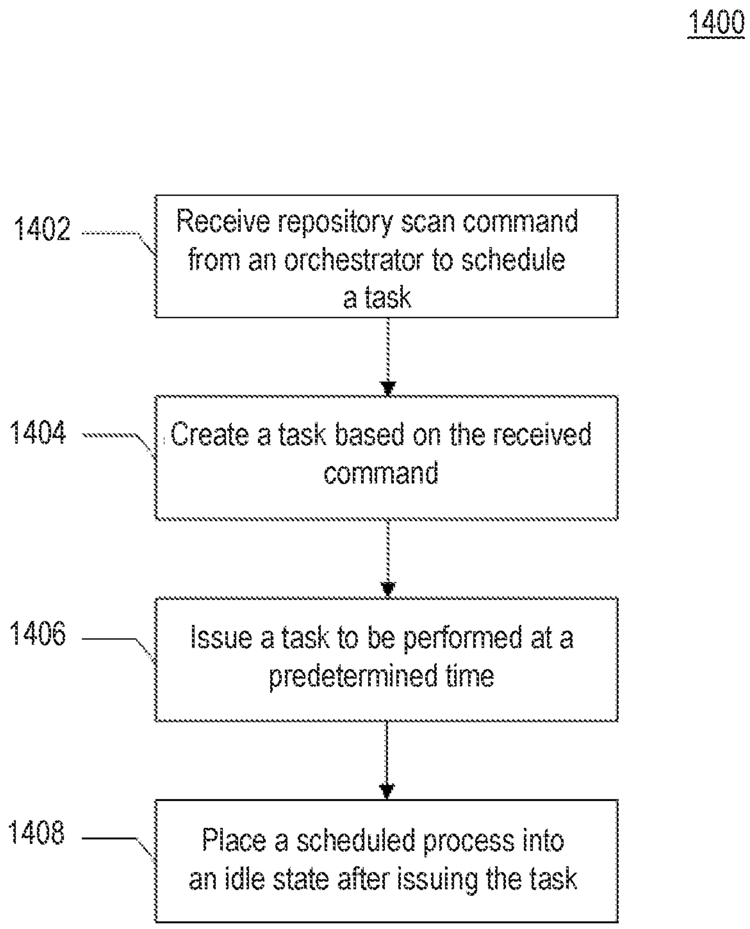
FIG. 14 is a flowchart describing an exemplary method for scheduling tasks by a scheduling process in a computer system, consistent with some disclosed embodiments.

FIG. 14 is a flowchart describing an exemplary method 1400 for scheduling tasks by a scheduling process in a computer system, as described above in connection with FIGS. 2 and 5, consistent with some disclosed embodiments. The system may include a scheduler, a repository, a data cluster, and a PII repository. A task corresponds to a query for the PII. A request scheduler may schedule a task. The task may be transferred to PII repository.

The method for scheduling tasks described herein is a dynamically built process based on the metadata. The processes described herein are similar to the processes described in connection to FIG. 2. In some embodiments, the orchestrator may retrieve metadata for each subsystem through one or more retrieval protocols and a search request for the PII in each subsystem may be dynamically built to incorporate indications of PII present in a dataset by the metadata. In some embodiments, metadata may be automatically gathered into the reference repository through a periodic refresh cycle, so that metadata may be referenced by the orchestrator through one or more retrieval protocols.

At step 1402, a command may be received by at least one processor from an orchestrator component via a scheduling queue. The system as described above in connection with FIGS. 2 and 5, may generate a case that is tracked by compliance with privacy laws. The system may be accessed via an API method to detect any new cases. The system may send work command messages with case provided input data to each service worker to scan the repository for the required case response. Responsive to a receipt of the work command message, a service worker may perform a plurality of queries, accumulate data results, and respond to the internal orchestrator service. A service worker may be a docker image operating in OCP environment. The orchestrator service may finalize the formatting and generate the data response. A service worker may use metadata for a repository to instantiate a query.

When a new case, corresponding to a new user, is found, work command messages may be sent to and from data source systems to each worker to scan repository for the required case response, wherein the response comprises an individual's PII from each of the one or more data storage systems. Metadata for each subsystem may be retrieved and a search request for the PII in each subsystem may be dynamically built based on the metadata. The search request for each subsystem may be built according to the format identified by the metadata and information from the PII request. The dynamically built search request may be executed on each identified subsystem. When an existing case, corresponding to an existing user, is found, a response may be generated, wherein the response may comprise the PII from each of the one or more data storage systems.

At step 1404, a task, corresponding to a PII query, may be created by the at least one processor based on the received command. A request for the PII may be received by at least one processor from an orchestrator component via a scheduler. The computer system detects any new personal data query cases, corresponding to new users, and existing cases, corresponding to existing users, as described above.

At step 1406, the task may be issued by the at least one processor to a service to perform the task at a predetermined time. The new cases may be created by the orchestrator, which may create sub-tasks. The scheduler then may search the sub-tasks, build the case with correct data, and assign it to a worker. The orchestrator service may finalize the formatting and generate the data response. In some embodiments, workers may be allocated in Kubernetes, which itself can load up new workers as needed up to a maximum, at which point a queue may be created and tasks may begin to accumulate, and an alert may be given to a human operator, who can manually assign more resources.

At step 1408, the scheduling process may be placed into an idle state by the at least one processor after issuing the task until a next predetermined time. In some embodiments, placing the process into an idle state may be done to reset the service to enable the service to process another event.

The preceding description provided several examples of processing a request to access PII. The mechanisms used by a system to process such a request may vary depending upon the particular implementation chosen by the data owner. While illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

It is intended, therefore, that the specification and examples be considered as example only, with a true scope and spirit being indicated by the following claims and their full scope of equivalents.

The invention claimed is:

1. A method for deleting personal data, comprising:

receiving, by at least one processor, a request from a communication device associated with an individual to delete the personal data;

processing the request by:

retrieving metadata relating to each of a plurality of subsystems that may contain the personal data; and dynamically building a query for each of the plurality of subsystems based on the retrieved metadata;

verifying an identity associated with the individual by the at least one processor;

distributing the query to each of the plurality of subsystems verifying the identity by the at least one processor;

logging the request in a transaction log by the at least one processor, wherein the log is used to prove compliance with privacy regulations and to track the request for the personal data;

responsive to verification of the identity, comparing the request with a data retention policy by the at least one processor, the data retention policy including a data retention end date;

placing the request in a queue by the at least one processor to be processed on the data retention end date;

upon reaching the data retention end date, automatically issuing and executing, for each of the plurality of subsystems, a native deletion request that is dynamically built based on the retrieved metadata for the each of the plurality of subsystems; and deleting the personal data by each of the plurality of subsystems.

2. The method of claim 1, further comprising:

storing the request in a log entry by the at least one processor, wherein the log entry does not contain any individual personal data.

3. The method of claim 2, further comprising:

updating the log entry by the at least one processor to indicate whether the request was denied or processed.

4. The method of claim 1, further comprising:

determining, by the at least one processor, whether a date of the request is earlier than the data retention end date;

determining, by the at least one processor, whether a legal hold applies to the requested personal data;

responsive to a determination that the date of the request is earlier than the data retention end date, transmitting a denial notification to the communication device that the request is denied based on the data retention end date.

5. The method of claim 1, further comprising:

responding to the individual by the at least one processor that the request will automatically be processed on the data retention end date.

6. The method of claim 1, further comprising:

responsive to a determination that the date of the request is later than the data retention end date, processing the request to delete the personal data from one or more databases associated with the at least one processor; and responsive to a determination that the individual has an active account, setting the data retention end date to null and denying the request.

7. The method of claim 1, wherein the request is received via an electronic mail message from the communication device associated with the individual.

8. The method of claim 1, wherein the request is received from the communication device associated with the individual via an electronic form provided by the at least one processor.

9. The method of claim 1, wherein verifying the identity further includes:

verifying a single data element, wherein the single data element is a unique identifier issued to the individual.

10. The method of claim 1, wherein verifying the identity further includes:

verifying a primary data element and a secondary data element.

11. The method of claim 1, further comprising:

determining, by the at least one processor, whether a legal hold applies to the personal data, wherein the legal hold includes a legal hold end date;

responsive to a determination that the legal hold applies:

on a condition that the date of the request is earlier than the legal hold end date, responding to the individual that the request is denied based on the legal hold end date;

on a condition that the date of the request is later than the legal hold end date and earlier than the data retention end date, responding to the individual that the request is denied based on the data retention end date; and on a condition that the date of the request is later than the legal hold end date and later than the data retention end date, processing the request to delete the personal data.

12. The method of claim 1, further comprising:

receiving an indication from each subsystem that the personal data has been deleted by each of the plurality of subsystems.

13. The method of claim 10, wherein the primary data element further includes one of: a unique identifier issued to the individual, a Social Security Number of the individual, a complete name of the individual, a driver's license number of the individual, a passport number of the individual, or a unique identification number from an official government-issued document of the individual.

14. The method of claim 10, wherein the secondary data element further includes one of: a telephone number of the individual, a full address of the individual, an electronic mail address of the individual, or an account number of the individual.

15. The method of claim 14, further comprising:

receiving an option selection for the request to be automatically processed, on a condition that the option selection is performed prior to placing the request in the queue.

16. The method of claim 15, further comprising:

storing the request in a log entry in at least one or more data storage systems, wherein the log entry does not contain any individual personal data; and updating the log entry to indicate whether the request was denied or processed by each of the plurality of subsystems.

17. The method of claim 16, further comprising:

determining, by the at least one processor, which subsystems of the plurality of subsystems further comprise one or more pieces of the personal data;

creating a graphical representation by the at least one processor showing which subsystems of the plurality of subsystems further comprise one or more pieces of the personal data; and displaying the graphical representation on the communication device by the at least one processor.

18. The method of claim 17, further comprising:

submitting a request to update or correct one or more items of the personal data:

on a condition that the individual is only permitted to edit certain data fields, as determined by a data owner or by an applicable privacy regulation; and on a condition that the individual submits a proposed change to the personal data that is verified by the data owner before the change can be made.

19. The method of claim 18, wherein:
the request includes information to be changed.

20. The method of claim 19, further comprising:
comparing the request to delete the personal data with a data retention policy of the data owner, wherein:
the data retention policy includes a data retention end date;
the data retention policy is stored in a database; and
the data retention policy defines how the data is stored, how long the data is stored, how the data is deleted, and whether there is a legal hold applicable to the data.

21. The method of claim 20, further comprising:
placing the request into a queue to be processed on the data retention end date; and
on a condition that the request date is earlier than the data retention end date:
generating a response indicating that the request cannot be processed because the date of the request is earlier than the data retention end date and that the request will automatically be processed on the data retention end date; and
sending the response to the communication device.

22. The method of claim 21, further comprising:
presenting, on the communication device, an option to place the request in an end date queue to be processed on the data retention end date.

23. The method of claim 22, further comprising:
denying the request to delete the personal data on a condition that the individual has an active account with the data owner.

* * * * *